United States Patent
Tabata et al.

(10) Patent No.: US 9,067,580 B2
(45) Date of Patent: Jun. 30, 2015

(54) CONTROL DEVICE FOR VEHICLE DRIVE DEVICE

(75) Inventors: Atsushi Tabata, Okazaki (JP); Tatsuya Imamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 14/123,146

(22) PCT Filed: Jun. 1, 2011

(86) PCT No.: PCT/JP2011/062601
§ 371 (c)(1),
(2), (4) Date: Nov. 29, 2013

(87) PCT Pub. No.: WO2012/164699
PCT Pub. Date: Dec. 6, 2012

(65) Prior Publication Data
US 2014/0100075 A1    Apr. 10, 2014

(51) Int. Cl.
*B60W 10/02*    (2006.01)
*B60W 10/06*    (2006.01)
*B60W 10/08*    (2006.01)
(Continued)

(52) U.S. Cl.
CPC .............. *B60W 10/10* (2013.01); *Y10T 477/23* (2015.01); *Y10T 477/26* (2015.01); *B60W 10/026* (2013.01); *B60K 6/44* (2013.01); *B60K 6/485* (2013.01); *B60K 6/547* (2013.01); *B60W 10/023* (2013.01); *B60W 20/00* (2013.01); *B60Y 2400/426* (2013.01); *Y02T 10/623* (2013.01); *Y02T 10/6226* (2013.01); *B60W 10/06* (2013.01); *B60W 10/08* (2013.01); *B60W 10/115* (2013.01); *B60W 30/1882* (2013.01);
(Continued)

(58) Field of Classification Search
CPC ... B60W 10/023; B60W 10/08; B60W 10/06; B60W 30/1882; B60W 20/00; B60W 20/1082; B60W 10/026; Y10T 477/23; Y10T 477/26; Y02T 10/6286; Y02T 10/623; Y02T 10/6226; B60K 6/44; B60K 6/485; B60Y 2400/426
See application file for complete search history.

(56) References Cited

U.S. PATENT DOCUMENTS 6,183,389 B1 *  2/2001  Tabata .............................. 477/5
7,073,616 B2 *  7/2006  Itoh et al. .................... 180/65.25
(Continued)

FOREIGN PATENT DOCUMENTS

JP    A 2000-225871    8/2000
JP    A 2007-191049    8/2007
(Continued)

*Primary Examiner* — Sherry Estremsky
(74) *Attorney, Agent, or Firm* — Oliff PLC

(57) ABSTRACT

The control device of a vehicle drive device is configured to have an electric path and a mechanical path, to control an operating point of the engine by adjusting a torque of the first electric motor, to select a transmission path with better power transmission efficiency between a power transmission efficiency in a first transmission path transmitting the power of the engine toward the drive wheels by using both the power transmission via the electric path and the power transmission only via fluid in the hydraulic power transmission device in the mechanical path and a power transmission efficiency in a second transmission path transmitting the power of the engine toward the drive wheels through power transmission when the lockup clutch of the hydraulic power transmission device is driven to perform an engagement or slip operation in the mechanical path.

10 Claims, 15 Drawing Sheets

(51) Int. Cl.
*B60W 10/10* (2012.01)
*B60K 6/44* (2007.10)
*B60K 6/485* (2007.10)
*B60K 6/547* (2007.10)
*B60W 20/00* (2006.01)
*B60W 10/115* (2012.01)
*B60W 30/188* (2012.01)

(52) U.S. Cl.
CPC .......... *B60W20/1082* (2013.01); *B60W 20/30* (2013.01); *Y02T 10/6286* (2013.01)

(56) References Cited

U.S. PATENT DOCUMENTS

| | | | |
|---|---|---|---|
| 7,100,720 B2 * | 9/2006 | Ishikawa | 180/65.26 |
| 2011/0005215 A1 | 1/2011 | Ota et al. | |
| 2013/0245875 A1 | 9/2013 | Imamura et al. | |
| 2014/0156129 A1 * | 6/2014 | Tabata et al. | 701/22 |

FOREIGN PATENT DOCUMENTS

| | | |
|---|---|---|
| JP | A 2009-220618 | 10/2009 |
| WO | WO 2012/070156 A1 | 5/2012 |

* cited by examiner

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev1 |  |  | ○ |  |  | ○ |
| Rev2 |  |  |  | ○ |  | ○ |

| TRANSMISSION PATH | ENGINE EFFICIENCY | TRANSMISSION EFFICIENCY |
|---|---|---|
| ○ HYDRAULIC | × | △ |
| ● HYDRAULIC + ELECTRIC | ○ | × |
| □ CLUTCH | ○ | ○ |

| TRANSMISSION PATH | ENGINE EFFICIENCY | TRANSMISSION EFFICIENCY |
|---|---|---|
| ○ HYDRAULIC | × | × |
| ● HYDRAULIC + ELECTRIC | ○ | ×～○ |
| □ CLUTCH | ×～○ | ○ |

United States Patent US 9,067,580 B2

CONTROL DEVICE FOR VEHICLE DRIVE DEVICE

TECHNICAL FIELD

The present invention relates to a control device of a vehicle drive device including an engine, an electric motor, and a hydraulic power transmission device having a lockup clutch such that a power of the engine can be transmitted through a plurality of transmission paths.

BACKGROUND ART

A vehicle drive device is well known that includes an engine and a hydraulic power transmission device. For example, this corresponds to a vehicle drive device described in Patent Document 1. Such a vehicle drive device has an engine rotation speed (rotation speed of an input-side rotating element of the hydraulic power transmission device) passively determined depending on a vehicle speed (rotation speed of an output-side rotating element of the hydraulic power transmission device), characteristics of the hydraulic power transmission device, and an engine output. Power transmission efficiency is also passively determined in a mechanical path hydraulically transmitting the engine output through the hydraulic power transmission device.

PRIOR ART DOCUMENT

Patent Document

Patent Document 1: Japanese Laid-Open Patent Publication No. 2009-220618

SUMMARY OF THE INVENTION

Problem to be Solved by the Invention

Considering improvement in fuel efficiency of a vehicle, for example, it is desirable to drive an engine at an engine operating point reducing a fuel consumption rate as low as possible. It is also desirable to improve power transmission efficiency. In this regard, in a vehicle drive device having a first electric motor disposed on the input side of a hydraulic power transmission device and a second electric motor disposed such that power can be transmitted to drive wheels, it is conceivable that the first electric motor arbitrarily controls the engine operating point. In such a case, power transmission efficiency in a mechanical path is changed. Additionally, the mechanical path and an electric path through electric power transmission between the first electric motor and the second electric motor are used together as a transmission path transmitting the engine output toward the drive wheels. Therefore, the engine operating point must be controlled in consideration of a change in combined power transmission efficiency determined depending on the power transmission efficiencies of the respective transmission paths. On the other hand, if the hydraulic power transmission device has a known lockup clutch, the engagement of the lockup clutch enables the mechanical path to transmit power without via fluid and can improve the power transmission efficiency as compared to the hydraulic transmission. However, in such a case, the engine operating point (particularly, engine rotation speed) is uniquely constrained by the rotation speed of the output-side rotating element of the hydraulic power transmission device and the engine operating point cannot arbitrarily be controlled by the first electric motor. The problem as described above is not known and no proposal has been made for achieving fuel efficiency improvement of a vehicle in consideration of handling of the mechanical path capable of changing a hydraulic transmission part through operation of the lockup clutch in a vehicle drive device capable of controlling the engine operating point with the first electric motor.

The present invention was conceived in view of the situations and it is therefore an object of the present invention to provide a control device of a vehicle drive device capable of achieving further fuel efficiency improvement of a vehicle when an engine operating point can be controlled by adjusting a torque of an electric motor.

Means for Solving the Problem

To achieve the object, the first aspect of the invention provides (a) a control device of a vehicle drive device including a hydraulic power transmission device having a lockup clutch being configured to directly couple an input-side rotating element to which a power from an engine is input and an output-side rotating element outputting power to drive wheels, a first electric motor directly or indirectly coupled to the input-side rotating element, and a second electric motor directly or indirectly coupled to the drive wheels, (b) the control device of a vehicle drive device having an electric path through which a power is electrically transmitted by giving/receiving electric power between the first electric motor and the second electric motor and a mechanical path through which a power is mechanically transmitted via the hydraulic power transmission device, the control device of a vehicle drive device being configured to control an operating point of the engine by adjusting a torque of the first electric motor, (c) the control device of a vehicle drive device selecting a transmission path with better power transmission efficiency between a power transmission efficiency in a first transmission path transmitting the power of the engine toward the drive wheels by using both the power transmission via the electric path and the power transmission only via the fluid in the hydraulic power transmission device in the mechanical path and a power transmission efficiency in a second transmission path transmitting the power of the engine toward the drive wheels through power transmission when the lockup clutch of the hydraulic power transmission device is driven to perform an engagement or slip operation in the mechanical path.

Effects of the Invention

Consequently, since the electric path through which the power is electrically transmitted by giving/receiving the electric power between the first electric motor and the second electric motor and the mechanical path through which the power is mechanically transmitted via the hydraulic power transmission device are included, the operating point of the engine can be controlled by adjusting the torque of the first electric motor without being constrained by a rotation speed of the output-side rotating element, the engine can be driven at an operating point optimal for the fuel efficiency improvement, for example, and the vehicle fuel efficiency can be improved. In addition, since the transmission path is selected that has better power transmission efficiency between the power transmission efficiency in the first transmission path transmitting the power of the engine toward the drive wheels by using both the power transmission via the electric path and the power transmission only via fluid in the hydraulic power transmission device in the mechanical path and the power transmission efficiency in the second transmission path transmitting the power of the engine toward the drive wheels through the power transmission when the lockup clutch of the hydraulic power transmission device is driven to perform the engagement or slip operation in the mechanical path, when the engine operating point can be controlled by adjusting a torque of an electric motor, further fuel efficiency improvement of the vehicle can be achieved.

The second aspect of the invention provides the control device of a vehicle drive device recited in the first aspect of the invention, wherein if the operating point of the engine is differentiated between when the first transmission path is used and when the second transmission path is used, a transmission path is selected that has better total efficiency represented by the product of engine efficiency at each operating point of the engine and the power transmission efficiency. Consequently, when the engine operating point can be controlled by adjusting the torque of the electric motor, further fuel efficiency improvement of the vehicle can properly be achieved.

The third aspect of the invention provides the control device of a vehicle drive device recited in the first or second aspect of the invention, wherein the power transmission efficiency in the first transmission path is calculated based on a transmission efficiency via the electric path and a transmission efficiency only via fluid in the hydraulic power transmission device in the mechanical path. Consequently, the power transmission efficiency in the first transmission path is properly obtained.

The fourth aspect of the invention provides the control device of a vehicle drive device recited in any one of the first to third aspects of the invention, wherein when the power transmission in the first transmission path generates a power circulation state in which the first electric motor consumes an electric power while the second electric motor generates an electric power, the lockup clutch is driven to perform the engagement or slip operation so as to reduce or avoid the power circulation state. Consequently, although the generation of the power circulation state considerably increases an electric loss in the case of transmission via the electric path, resulting in considerable reduction in the power transmission efficiency in the first transmission path, since the lockup clutch is driven to perform the engagement or slip operation so as to reduce chances of generating the power circulation state, the reduction in power transmission efficiency can be restrained and the fuel efficiency deterioration of the vehicle can be suppressed.

The fifth aspect of the invention provides the control device of a vehicle drive device recited in the fourth aspect of the invention, wherein when an actual running state is a running state in which the power circulation state is to be avoided predetermined based on deterioration of engine efficiency associated with movement of the operating point of the engine due to the engagement or slip operation of the lockup clutch and improvement in power transmission efficiency due to the engagement or slip operation of the lockup clutch, the lockup clutch is driven to perform the engagement or slip operation. Consequently, the lockup clutch is properly driven to perform the engagement or slip operation such that the increase in electric loss associated with the generation of the power circulation state is suppressed, and the fuel efficiency deterioration of the vehicle can be properly suppressed.

The sixth aspect of the invention provides the control device of a vehicle drive device recited in any one of the first to fifth aspects of the invention, wherein if the operation of the lockup clutch is limited, the lockup clutch is actuated in preference to selecting the transmission path with better power transmission efficiency. Consequently, the operation of the lockup clutch is certainly limited.

The seventh aspect of the invention provides the control device of a vehicle drive device recited in the sixth aspect of the invention, wherein if a temperature of operating oil of the lockup clutch is relatively high, priority is given to driving the lockup clutch to perform the engagement operation, and wherein if a temperature of operating oil of the lockup clutch is relatively low, priority is given to driving the lockup clutch to perform release operation or to inhibiting only the slip operation of the lockup clutch. Consequently, if the temperature of the operating oil is relatively high, the engagement operation of the lockup clutch is performed to cool the operating oil and, on the other hand, if the temperature of the operating oil is relatively low, the release operation of the lockup clutch is performed or only the slip operation of the lockup clutch is inhibited for promoting the warming-up of the equipment through which the operating oil flows and avoiding deterioration of drivability due to deterioration of controllability of the lockup clutch itself.

The eighth aspect of the invention provides the control device of a vehicle drive device recited in any one of the first to seventh aspects of the invention, wherein in the first transmission path, the operating point of the engine is shifted to a side of greater total efficiency represented by the product of engine efficiency at the operating point of the engine and power transmission efficiency of the first transmission path. Consequently, as compared to the case that the operating point of the engine is not changed depending on the total efficiency, the efficiency of the vehicle drive device is increased as a whole and the vehicle fuel efficiency can be improved.

The ninth aspect of the invention provides the control device of a vehicle drive device recited in any one of the first to eighth aspects of the invention, wherein the torque of the first electric motor is adjusted so that a sum of an engine torque and the torque of the first electric motor is balanced with an input-side load torque generated in the input-side rotating element depending on a speed ratio of the hydraulic power transmission device. Consequently, the torque of the first electric motor can easily be adjusted based on the characteristics of the hydraulic power transmission device.

MODE FOR CARRYING OUT THE INVENTION

In the present invention, preferably, the fuel efficiency refers to a running distance per unit fuel consumption etc., and improvement in fuel efficiency refers to extension of the running distance per unit fuel consumption, or reduction in fuel consumption rate (=fuel consumption/drive wheel output) of the vehicle as a whole. Contrarily, deterioration in fuel efficiency refers to shortening of the running distance per unit fuel consumption or increase in fuel consumption rate of the vehicle as a whole.

Preferably, the operating point of the engine is an operating point indicative of an operating state of the engine represented by rotation speed and output torque of the engine etc. In other words, the operating point of the engine refers to an operating state of the engine indicated by one point in two-dimensional coordinates of an axis indicative of rotation speed of the engine and an axis indicative of output torque of the engine.

Preferably, the hydraulic power transmission device is a torque converter including a pump impeller acting as the input-side rotating element, a turbine impeller acting as the output-side rotating element, and a stator impeller.

Preferably, the vehicle drive device includes an electric storage device connected to each of the first electric motor and the second electric motor such that electric power can be given/received and the second electric motor is supplied with a remaining portion of the electric power generated by the first electric motor after subtracting electric power to be stored into the electric storage device, so as to drive the second electric motor.

Preferably, adjusting the torque of the first electric motor refers to adjusting power (electric power) transmitted through the electric path, or in other words, adjusting a power transmission rate of the electric path or the mechanical path. Therefore, the operating point of the engine is controlled by adjusting the power transmitted through the electric path.

Preferably, the electric path is a power transmission path through which power is electrically transmitted by supplying all or a portion of the electric power generated by the first electric motor to the second electric motor:

An example of the present invention will now be described in detail with reference to the drawings.

First Example

Figures 1, 2:
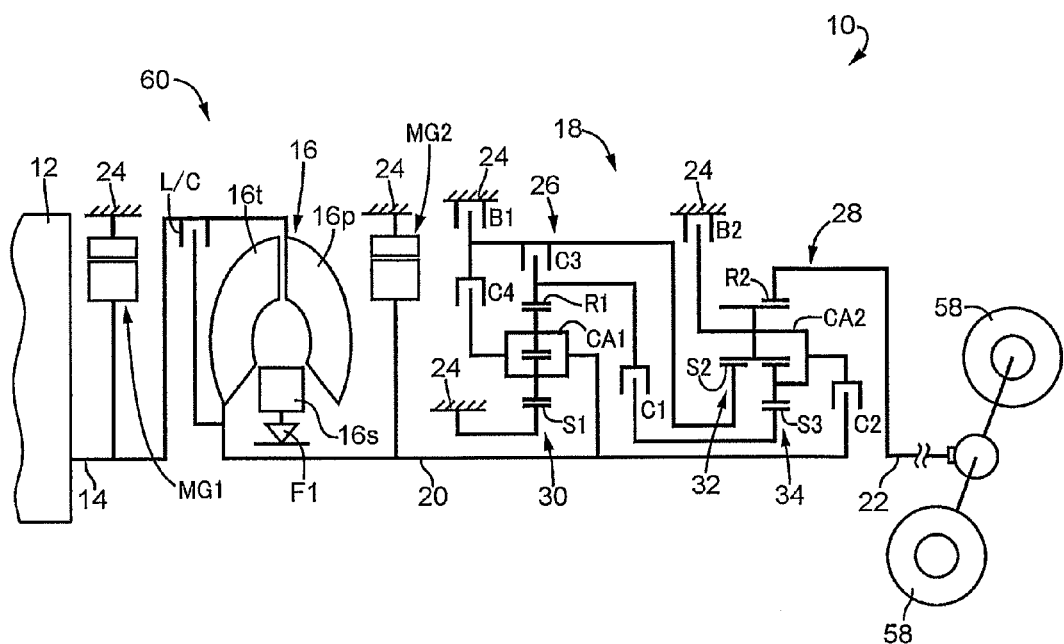
FIG. 1 is a schematic for explaining a configuration of a vehicle drive device of one example of the present invention.
FIG. 2 is an operation table of hydraulic friction engagement devices for establishing shift stages in an automatic transmission depicted in FIG. 1.

FIG. 1 is a schematic for explaining a configuration of a vehicle drive device 10 of one example of the present invention. In FIG. 1, the vehicle drive device 10 is preferably employed in FR (front-engine rear-drive) type vehicles and includes an engine 12 made up of an internal-combustion engine, a torque converter (hydraulic power transmission device) 16 coupled to a crankshaft 14 of the engine 12, an automatic transmission 18 disposed between the torque converter 16 and drive wheels 58 and coupled to the output side of the torque converter 16, a first electric motor MG1 disposed between the engine 12 and the torque converter 16 and coupled to the crankshaft 14, and a second electric motor MG2 disposed between the torque converter 16 and the automatic transmission 18 and coupled to an input shaft 20 of the automatic transmission 18. The torque converter 16, the automatic transmission 18, the first electric motor MG1, the second electric motor MG2, etc., are configured symmetrically relative to a common axial center thereof and the lower halves thereof from the axial center are not depicted in FIG. 1.

The torque converter 16 is a hydraulic power transmission device including a pump impeller 16p acting as an input-side rotating element to which power from the engine 12 is input, a turbine impeller 16t acting as an output-side rotating element outputting power to the drive wheels 58, a stator impeller 16s, and a unidirectional clutch F1. The pump impeller 16p, i.e., a pump impeller, is coupled to the crankshaft 14 of the engine 12 and the first electric motor MG1 and is rotationally driven by the engine 12 to generate a fluid flow due to a flow of operating oil in the torque converter 16. The turbine impeller 16t, i.e., a turbine runner, is coupled to the input shaft 20 of the automatic transmission 18 and rotated in response to the fluid flow from the pump impeller 16p. The stator impeller 16s is disposed in the fluid flow from the pump impeller 16p to the turbine impeller 16t and supported by the unidirectional clutch F1 rotatably in the positive rotation direction of the crankshaft 14 (the rotation direction of the crankshaft 14 during the operation of the engine 12) and non-rotatably in the negative rotation direction. The input shaft 20 of the automatic transmission 18 also acts as an output shaft, i.e., a turbine shaft, of the torque converter 16. As can be seen from FIG. 1, since the engine 12, the first electric motor MG1, and the pump impeller 16p are coupled in series in this example, a rotation speed Np of the pump impeller 16p (hereinafter referred to as a pump rotation speed Np) is the same as a rotation speed $N_{MG1}$ of the first electric motor MG1 (hereinafter referred to as a first electric motor rotation speed $N_{MG1}$) and an engine rotation speed Ne. Since the turbine impeller 16t, the second electric motor MG2, and the input shaft 20 of the automatic transmission 18 are coupled in series, a rotation speed Nt of the turbine impeller 16t (hereinafter referred to as a turbine rotation speed Nt) is the same as a rotation speed $N_{MG2}$ of the second electric motor MG2 (hereinafter referred to as a second electric motor rotation speed $N_{MG2}$) and a rotation speed $N_{ATIN}$ of the input shaft 20.

The torque converter 16 includes a lockup clutch L/C capable of direct coupling between the pump impeller 16p and the turbine impeller 16t. The lockup clutch L/C is controlled to be in one of a completely engaged state, a slipping state, and a released state. When the lockup clutch L/C is in the released state, the torque is transmitted between the crankshaft 14 and the input shaft 20 via the operating oil in the torque converter 16 as described above. When the lockup clutch L/C is in the completely engaged state, the crankshaft 14 of the engine 12 and the input shaft 20 of the automatic transmission 18 are integrally coupled to each other and the torque is directly transmitted between the crankshaft 14 and the input shaft 20 without the intervention of the operating oil in the torque converter 16.

The first electric motor MG1 is coupled to the crankshaft 14 of the engine 12 in series via a damper etc., absorbing pulsation, for example, and is directly coupled to the pump impeller 16p of the torque converter 16. The second electric motor MG2 is coupled to the drive wheels 58 indirectly via the automatic transmission 18 etc. The first electric motor MG1 and the second electric motor MG2 are rotators configured to selectively acquire a function as an electric motor generating a drive torque and a function as an electric generator generating a regenerative torque and are made up of AC synchronous motor generators, for example. An electric storage device 36 acting as a battery and an inverter 38 for controlling the electric motors MG1 and MG2 are disposed in the vehicle drive device 10 (see FIG. 3), and the electric storage device 36, the first electric motor MG1, and the second electric motor MG2 are connected such that electric power can mutually be given/received. The first electric motor MG1 and the second electric motor MG2 can apply a drive torque in the positive rotation direction to the crankshaft 14 and the input shaft 20 through the drive thereof and can apply a load torque, i.e., a braking torque in the negative rotation direction to the crankshaft 14 and the input shaft 20 through the electric generation (regeneration) thereof while charging the electric storage device 36 disposed in a vehicle via the inverter 38. The positive rotation direction of the crankshaft 14 and the input shaft 20 is the rotation direction of the crankshaft 14 while the engine 12 is driven and the negative rotation direction is the rotation direction opposite to the positive rotation direction.

The automatic transmission 18 is interposed between the turbine impeller 16t of the torque converter 16 and the drive wheels 58 and is a transmission changing a speed of output of the torque converter 16 and the second electric motor MG2 for output from an output shaft 22. The automatic transmission 18 includes a first transmission portion 26 and a second transmission portion 28 housed in a transmission case 24 acting as a non-rotating member. The first transmission portion 26 is mainly made up of a double pinion type first planetary gear device 30. The second transmission portion 28 is mainly made up of a single pinion type second planetary gear device 32 and a double pinion type third planetary gear device 34.

Three rotating elements making up each of the first planetary gear device 30, the second planetary gear device 32, and the third planetary gear device 34 (sun gears S1, S2, S3, carriers CA1, CA2, and ring gears R1, R2) are partially coupled to each other or coupled to the input shaft 20, the output shaft 22, or the transmission case 24 directly or indirectly (or selectively) via hydraulic friction engagement devices (clutches C1, C2, C3, C4 and brakes B1, B2).

The clutches C1 to C4 and the brakes B1 and B2 are hydraulic friction engagement devices including a hydraulic cylinder and a multi-plate clutch or brake frictionally engaged depending on an oil pressure supplied to the hydraulic cylinder.

In the automatic transmission 18, the hydraulic friction engagement devices (the clutches C1 to C4, the brakes B1 and B2) are respectively engaged or released in accordance with a predetermined operation table depicted in FIG. 2 to establish shift stages of eight forward speeds and two reverse speeds having respective different gear ratios $\gamma_{AT}$ (=rotation speed $N_{ATIN}$ of the input shaft 20/rotation speed Nout of the output shaft 22) of the automatic transmission 18. In FIG. 2, "○" indicates an engaged state and a blank indicates a released state.

Automatic shift control of the automatic transmission 18 is provided in accordance with a known relationship (shift diagram, shift map) having preliminarily stored upshift and downshift lines made up of a plurality of shift lines set within two-dimensional coordinates of a vehicle speed axis and a required output torque axis (or accelerator opening degree axis). Specifically, a shift stage to be achieved in the automatic transmission 18 is determined based on a vehicle speed V [km/h] and a required output torque $T_{OUT}$ [N·m] from the shift diagram and each of the hydraulic friction engagement devices (the clutches C1 to C4, the brakes B1 and B2) in the automatic transmission 18 is engaged or released in accordance with the operation table depicted in FIG. 2 such that the determined shift stage (gear stage) is established. The engagement or release of the hydraulic friction engagement devices establishes the shift stages of eight forward speeds and two reverse speeds having the respective different gear ratios $\gamma_{AT}$ of the automatic transmission 18.

The vehicle drive device 10 configured as described above switches and actuates an engine running causing the vehicle to run with the power of the engine 12 and a motor running causing the vehicle to run with the power of the second electric motor MG2, depending on a running state of the vehicle. The switching between the engine running and the motor running is performed based on which of an engine running range and a motor running range set in the two-dimensional coordinates same as the shift diagram a running state of the vehicle belongs to.

In the vehicle drive device 10, for example, even when the vehicle running state belongs to the motor running range, if a charge remaining amount SOC (state of charge) of the electric storage device 36 is equal to or less than a predetermined value, the engine running is performed. When the vehicle is suddenly started or rapidly accelerated, the control is provided as needed such as using output of both the engine 12 and the second electric motor MG2 for running the vehicle.

Figure 3:
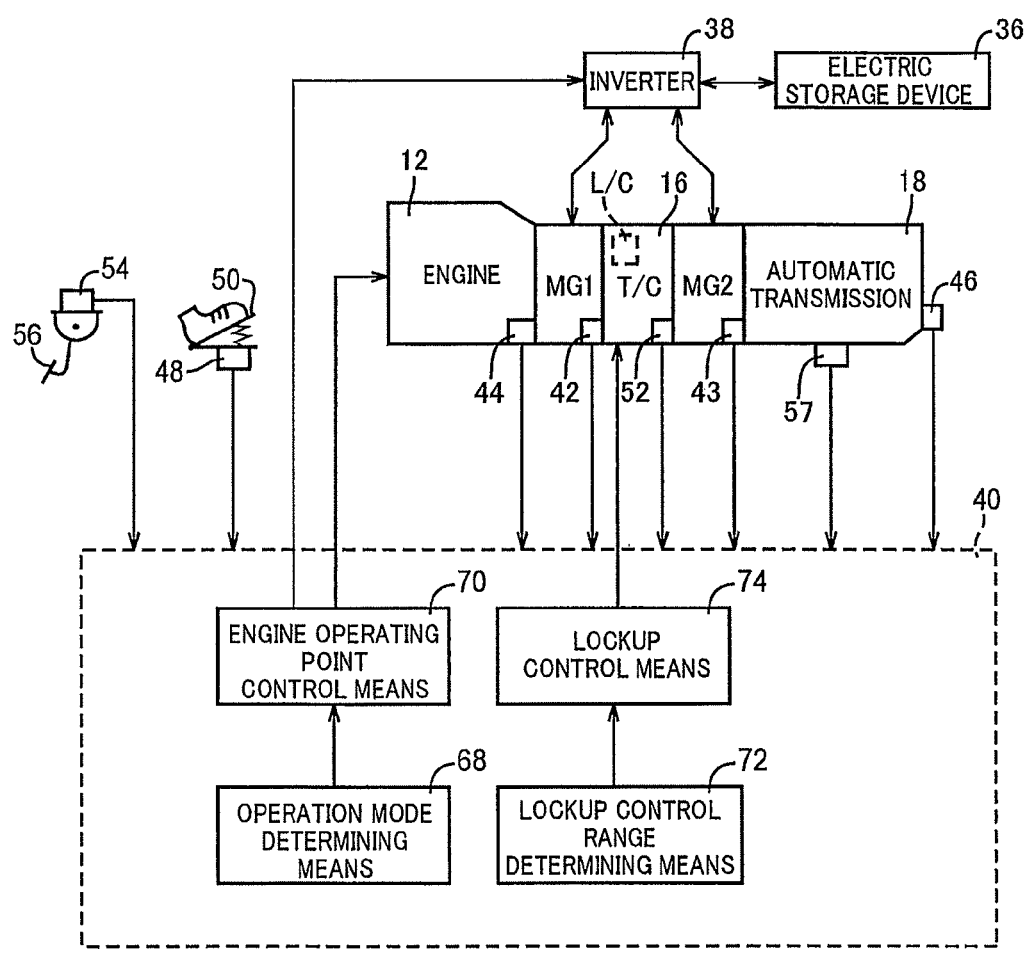
FIG. 3 is a diagram for explaining input signals input from sensors to an electronic control device for controlling the vehicle drive device of FIG. 1 and is a functional block diagram for explaining a main portion of the control function included in the electronic control device.

FIG. 3 is a diagram for explaining input signals input from sensors to an electronic control device 40 for controlling the vehicle drive device 10 and is a functional block diagram for explaining a main portion of the control function included in the electronic control device 40. In FIG. 3, the electronic control device 40 has a function as a control device of the vehicle drive device 10 and includes a so-called microcomputer equipped with a CPU, a RAM, a ROM, and an input/output interface, and the CPU executes signal processes in accordance with programs stored in advance in the ROM, while utilizing a temporary storage function of the RAM, to provide output control of the engine 12, shift control of the automatic transmission 18, and output control of the electric motors MG1 and MG2, or the like.

The electronic control device 40 is supplied with various input signals detected by sensors depicted in FIG. 3 disposed on the vehicle. The input signals include, for example, a signal indicative of the first electric motor rotation speed $N_{MG1}$ detected by a first electric motor rotation speed sensor 42 that is an MG1 resolver, a signal indicative of the second electric motor rotation speed $N_{MG2}$ detected by a second electric motor rotation speed sensor 43 that is an MG2 resolver, a signal indicative of the engine rotation speed Ne that is a rotation speed of the crankshaft 14 detected by an engine rotation speed sensor 44, a signal indicative of the vehicle speed V corresponding to a rotation speed Nout of the output shaft 22 (hereinafter referred to as an output shaft rotation speed Nout) detected by a vehicle speed sensor 46, a signal indicative of an accelerator opening degree Acc that is an operation amount of an accelerator pedal 50 detected by an accelerator opening degree sensor 48, a signal indicative of the turbine rotation speed Nt detected by a turbine rotation speed sensor 52, a signal indicative of whether a brake pedal 56 is depressed, detected by a foot brake switch 54, and a signal indicative of a temperature of operating oil $TH_{OIL}$ (hereinafter referred to as an operating oil temperature $TH_{OIL}$) of the automatic transmission 18 and the lockup clutch L/C detected by an oil temperature sensor 57.

The electronic control device 40 supplies various output signals to the devices disposed on the vehicle. The output signals include, for example, signals supplied to an ignition device, an electronic throttle valve, etc., for the output control of the engine 12, a signal supplied to the first electric motor MG1 for the output control of the first electric motor MG1, a signal supplied to the second electric motor MG2 for the output control of the second electric motor MG2, and a signal supplied to a solenoid valve etc., in a hydraulic control circuit for the shift control of the automatic transmission 18.

Figure 4:
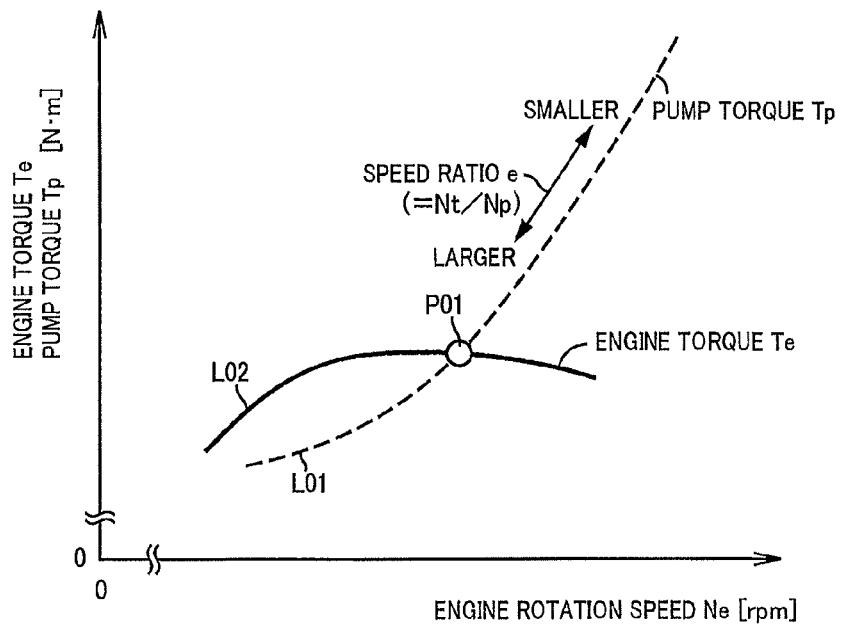
FIG. 4 is a diagram for explaining how an engine operating point is determined while a first electric motor and a second electric motor are not actuated in the vehicle drive device of FIG. 1.

FIG. 4 is a diagram for explaining how the operating point of the engine 12 is determined while the first electric motor MG1 and the second electric motor MG2 are not actuated. As depicted in FIG. 4, a pump torque Tp is an input-side load torque Tp generated in the pump impeller (input-side rotating element) 16p depending on a speed ratio e (=Nt/Np) of the torque converter 16 and has relationship with the engine rotation speed Ne as indicated by, for example, a broken line L01, under a certain constant turbine rotation speed Nt. The relationship between the pump torque Tp and the engine rotation speed Ne (=Np) as indicated by the broken line L01 is relationship satisfying an equation "$Tp=\Sigma\times Ne^2$" when expressed by using a capacitive coefficient z of the torque converter 16, which is a function of the speed ratio e. Therefore, as depicted in FIG. 4, when the engine rotation speed Ne is higher, the speed ratio e of the torque converter 16 is smaller, and when the engine rotation speed Ne is higher, the pump torque Tp is larger. On the other hand, an output torque Te of the engine 12 (hereinafter referred to as an engine torque Te) has relationship with the engine rotation speed Ne as indicated by, for example, a solid line L02, under a certain constant throttle valve opening degree $\theta T_H$ of an electronic throttle valve of the engine 12, and the solid line L02 intersects with the broken line L01. An intersection point P01 between the broken line L01 and the solid line L02 indicates a point of balance between the engine torque Te and the pump torque Tp and the intersection point P01 is defined as the operating point of the engine 12. Therefore, the operating point of the engine 12 is passively determined based on the turbine rotation speed Nt and the throttle valve opening degree $\theta_{TH}$. In contrast, in the present example, the operating point of the engine 12 can arbitrarily be changed by providing the output control of the first electric motor MG1 without being constrained by the turbine rotation speed Nt. This can be described with reference to FIG. 5.

Figure 5:
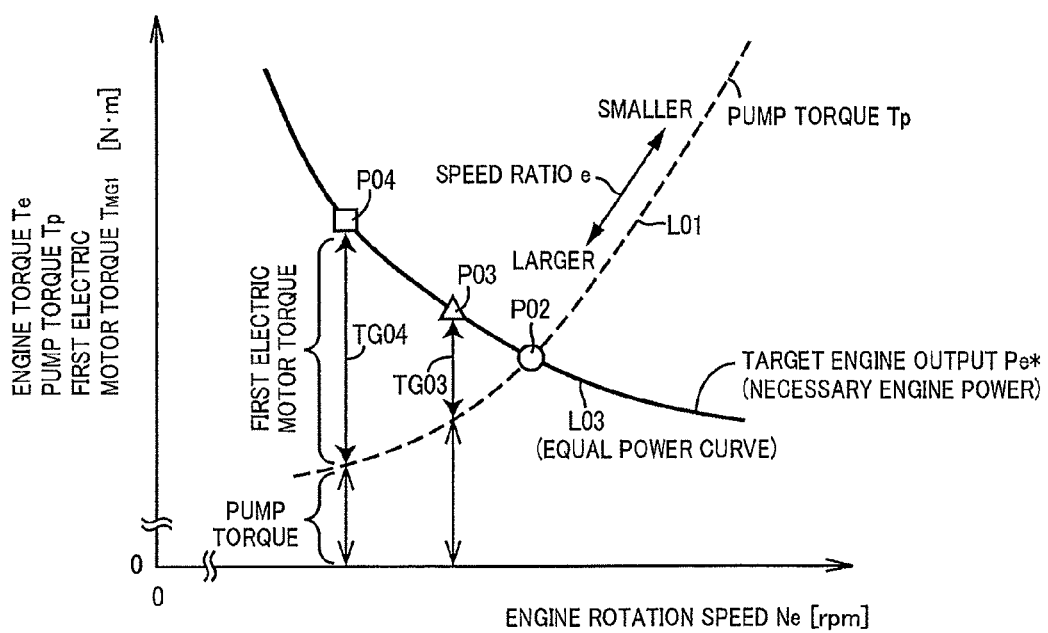
FIG. 5 is a diagram for explaining that the engine operating point can arbitrarily be changed by controlling the first electric motor in the vehicle drive device of FIG. 1.

FIG. 5 is a diagram for explaining that the operating point of the engine 12 can arbitrarily be changed by controlling the first electric motor MG1. In FIG. 5, the same reference numerals as FIG. 4 mutually denote the same elements and the turbine rotation speed Nt is assumed to be the same as FIG. 4. A solid line L03 of FIG. 5 is an equal power curve indicative of relationship between the engine rotation speed Ne and the engine torque Te when a necessary engine power Pe*, i.e., a target engine output Pe* serving as a target value of an engine output Pe (e.g., in kW) is set to a constant value and control is provided such that the engine output Pe converges to the target engine output Pe*. FIG. 5 depicts an example when the operating point of the engine 12 is arbitrarily set on the equal power curve (solid line L03). In FIG. 5, when the relationship between the pump torque Tp and the engine rotation speed Ne is indicated by the broken line L01 and the engine output Pe is set to the target engine output Pe* indicated by the solid line L03, if an output torque $T_{MG1}$ of the first electric motor MG1 (hereinafter referred to as first electric motor torque $T_{MG1}$) is not generated, the operating point of the engine 12 is a point P02; if the first electric motor MG1 is driven to perform electric generation operation and the first electric motor torque $T_{MG1}$ of TG03 is generated in the negative rotation direction, the operating point of the engine 12 is a point P03; and if an absolute value of the first electric motor torque $T_{MG1}$ is raised and the first electric motor torque $T_{MG1}$ of TG04 is generated in the negative rotation direction, the operating point of the engine 12 is a point P04. In short, in the vehicle drive device 10 of this example, the first electric motor torque $T_{MG1}$ can be adjusted such that the sum of the engine torque Te and the first electric motor torque $T_{MG1}$ is balanced with the pump torque Tp, i.e., such that the relationship of "$Tp=Te+T_{MG1}$ ($T_{MG1}$ of FIG. 5 is a negative value)" is satisfied, so as to arbitrarily change the operating point of the engine 12 without being constrained by the turbine rotation speed Nt. If the first electric motor MG1 is driven to perform electric generation operation, electric power generated by the first electric motor MG1 may be stored in the electric storage device 36; however, the electric power is basically supplied to the second electric motor MG2 and the second electric motor MG2 is driven. Therefore, the vehicle drive device 10 includes two power transmission paths, i.e., an electric path through which power (e.g., in kW) is electrically transmitted by giving/receiving electric power between the first electric motor MG1 and the second electric motor MG2 and a mechanical path through which power is mechanically transmitted via the torque converter 16, in parallel with each other between the engine 12 and the drive wheels 58. Since the operating point of the engine 12 can continuously be changed by adjusting the first electric motor torque $T_{MG1}$ without being constrained by the turbine rotation speed Nt as described above, the first electric motor MG1, the second electric motor MG2, and the torque converter 16 can perform continuously variable transmission operation in which a gear ratio (=Ne/Nt) is changed in a substantially stepless manner as a whole and it can be said that a continuously variable transmission 60 is formed.

Figure 6:
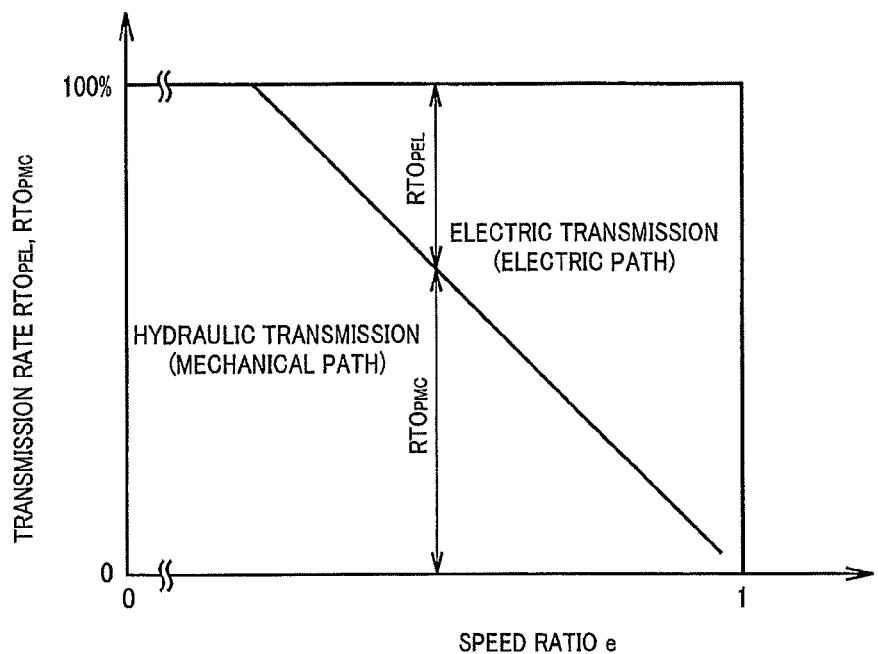
FIG. 6 is a conceptual diagram for explaining a proportion (transmission rate) of power transmitted through each of the electric path and the mechanical path when the engine operating point is changed under a certain constant target engine output in the vehicle drive device of FIG. 1.

FIG. 6 is a conceptual diagram for explaining a proportion (transmission rate) of power transmitted through each of the electric path and the mechanical path when the operating point of the engine 12 is changed under a certain constant target engine output Pe*. In FIG. 6, electric transmission represents that the power from the engine 12 is electrically transmitted, and therefore means the power transmission through the electric path, and hydraulic transmission represents that the power from the engine 12 is transmitted through fluid in the torque converter 16, and therefore means the power transmission through the mechanical path. In FIG. 5, the output control of the first electric motor MG1 is provided such that the first electric motor torque $T_{MG1}$ increases in absolute value in the negative rotation direction as the engine rotation speed Ne becomes lower, i.e., the speed ratio e of the torque converter 16 becomes larger and, therefore, as depicted in FIG. 6, when the speed ratio e becomes larger toward one, a transmission rate $RTO_{PEL}$ of power through the electric transmission becomes larger while a transmission rate $RTO_{PMC}$ of power through the hydraulic transmission becomes smaller and, specifically, when the speed ratio e is closer to one, the transmission rate $RTO_{PEL}$ of power through the electric transmission becomes closer to 100%. This tendency of change in the transmission rates $RTO_{PEL}$ and $RTO_{PMC}$ relative to the speed ratio e is the same regardless of the target engine output Pe* or the turbine rotation speed Nt.

Figure 7:
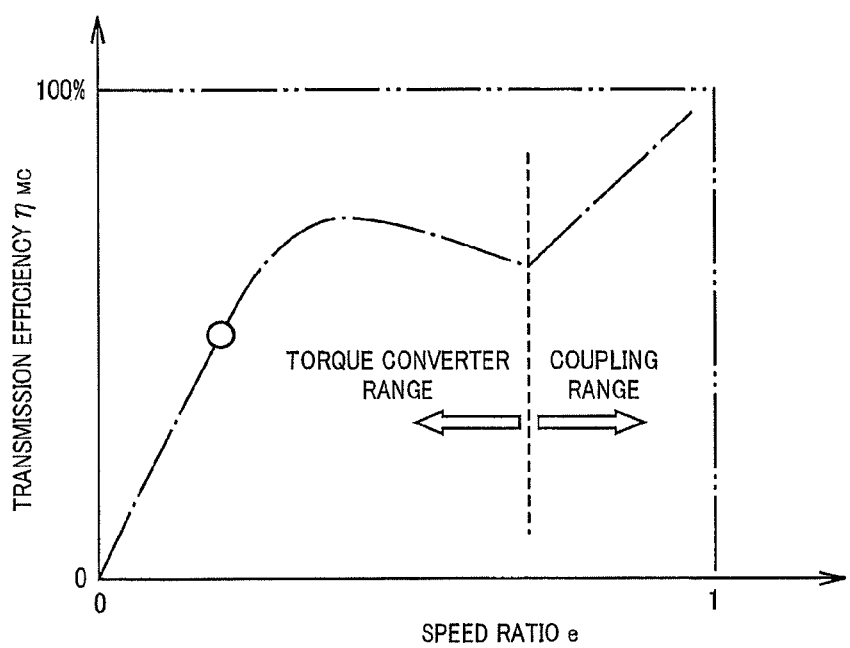
FIG. 7 is a diagram of relationship between transmission efficiency of a torque converter only, i.e., transmission efficiency of a mechanical path and a speed ratio of the torque converter in the vehicle drive device of FIG. 1.

Power transmission efficiency (=output power/input power; also simply referred to as transmission efficiency throughout the description) in the continuously variable transmission 60 made up of the first electric motor MG1, the second electric motor MG2, and the torque converter 16 will be described. First, transmission efficiency $\eta_{MC}$ of the torque converter 16 only, i.e., transmission efficiency $\eta_{MC}$ of the mechanical path, will be described with reference to FIG. 7. As depicted in FIG. 7, in a torque converter range on the side of a smaller speed ratio e, the transmission efficiency $\eta_{MC}$ of the torque converter 16 has a local maximum value at a predetermined speed ratio e and the transmission efficiency $\eta_{MC}$ becomes zero when the speed ratio e is zero. In a coupling range on the side of a larger speed ratio e, the transmission efficiency $\eta_{MC}$ becomes higher when the speed ratio e is larger, and the transmission efficiency $\eta_{MC}$ becomes highest when the speed ratio e is close to one in the torque converter range and the coupling range as a whole. Considering transmission efficiency $\eta_{EL}$ of the electric path and the transmission rates $RTO_{PEL}$ and $RTO_{PMC}$ depicted in FIG. 6 along with the transmission efficiency $\eta_{MC}$ of the torque converter 16, combined transmission efficiency $\eta_{CVT}$ can be obtained that is transmission efficiency in the case of transmitting the power from the engine 12 through the electric path and the mechanical path, i.e., the transmission efficiency $\eta_{CVT}$ of the entire continuously variable transmission 60.

Figure 8:
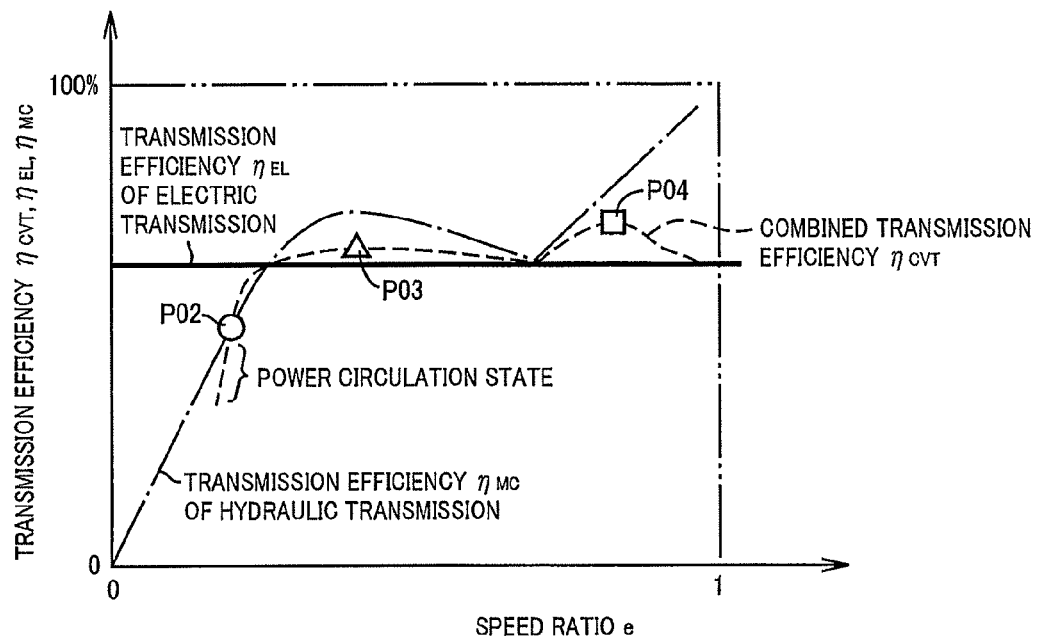
FIG. 8 is a diagram of relationship between combined transmission efficiency $\eta_{CVT}$ and the speed ratio of the torque converter in the vehicle drive device of FIG. 1.

FIG. 8 is a diagram of relationship between the combined transmission efficiency $\eta_{CVT}$ and the speed ratio e of the torque converter 16. In FIG. 8, a dashed-dotted line indicative of the transmission efficiency $\eta_{MC}$ of the mechanical path (hydraulic transmission) is the same as that of FIG. 7. As depicted in a solid line of FIG. 8, the transmission efficiency $\eta_{EL}$ of the electric path (electric transmission) is almost unchanged even when the speed ratio e of the torque converter 16 is changed, as compared to the transmission efficiency $\eta_{MC}$ of the mechanical path (hydraulic transmission). If the power from the engine 12 is transmitted through both the mechanical path and the electric path at the transmission rates $RTO_{PEL}$ and $RTO_{PMC}$ as depicted in FIG. 6 depending on the speed ratio e, the combined transmission efficiency $\eta_{CVT}$ is changed as indicated by a broken line in accordance with the speed ratio e. The points P02, P03, and P04 of FIG. 8 are the points P02, P03, and P04, respectively, of FIG. 5 expressed on the coordinate system of FIG. 8 and, in the case of FIG. 8, the combined transmission efficiency $\eta_{CVT}$ becomes highest at the speed ratio e indicated by the point P04 among the three points P02, P03, and P04. In FIG. 8, in a range of the speed ratio e lower than the speed ratio e indicated by the point P02, the combined transmission efficiency $\eta_{CVT}$ indicated by a broken line is significantly reduced lower than the transmission efficiency $\eta_{MC}$ of the mechanical path, and this is because the electric power transmission state between the first electric motor MG1 and the second electric motor MG2 turns to a power circulation state in which the first electric motor MG1 consumes electric power while the second electric motor MG2 generates electricity, or in other words, a power circulation state in which power is electrically transmitted from the second electric motor MG2 to the first electric motor MG1.

Since the vehicle drive device 10 can continuously change the operating point of the engine 12 by adjusting the first electric motor torque $T_{MG1}$ without being constrained by the turbine rotation speed Nt as described above, this example utilizes this function, i.e., the continuously variable transmission function of the continuously variable transmission 60 to provide control for efficiently activating the engine 12 and, moreover, for allowing the vehicle drive device 10 including the engine 12 to efficiently operate as a whole. A main portion of the control function will hereinafter be described.

Returning to FIG. 3, as depicted in FIG. 3, the electronic control device 40 includes an operation mode determining means 68 as an operation mode determining portion, and an engine operating point control means 70 as an engine operating point control portion.

The operation mode determining means 68 determines whether a predetermined system optimum operation mode is selected. For example, if an operation mode switch is turned on that is a switch switched on when a driver selects the system optimum operation mode, the operation mode determining means 68 determines that the system optimum operation mode is selected. The system optimum operation mode is an operation mode for achieving efficiency improvement in the engine 12 and the continuously variable transmission 60 as a whole rather than efficiently activating only the engine 12, and is selected when it is desired to give very high priority to the fuel efficiency improvement, for example. The system optimum operation mode may automatically be selected, for example, when the accelerator opening degree Ace is almost unchanged, instead of depending on switching of the operation mode switch.

Figure 9:
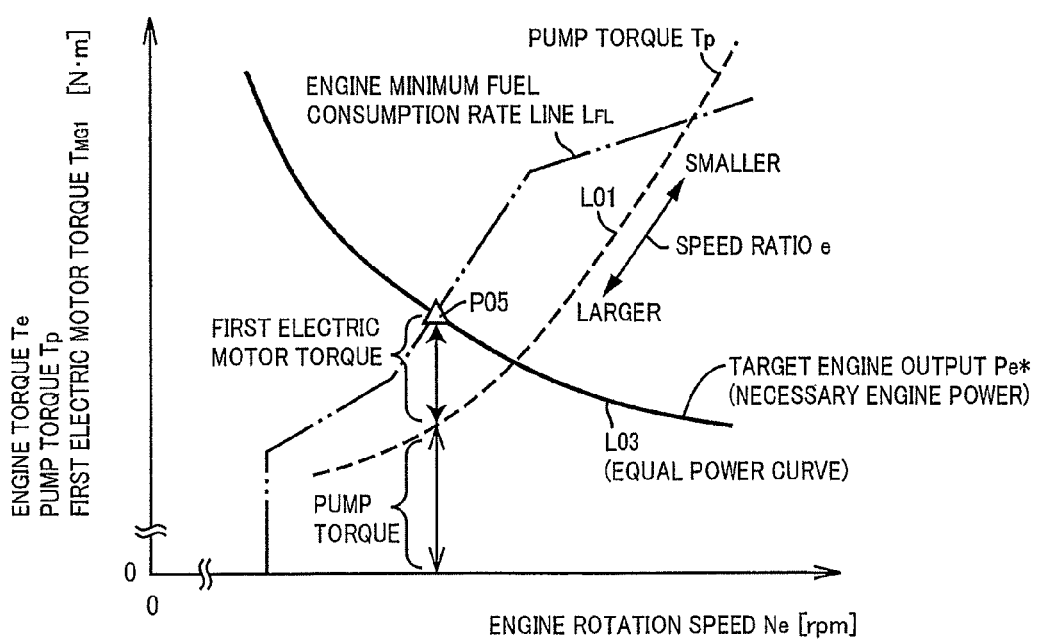
FIG. 9 is a diagram of a first electric motor torque and a pump torque when an operating point on an engine minimum fuel consumption rate line is defined as a target engine operating point under a certain constant turbine rotation speed in the coordinate system same as FIG. 5.

The engine operating point control means 70 provides engine operating point control in which the first electric motor torque $T_{MG1}$ is adjusted to control the operating point of the engine 12 during the engine running. When the first electric motor torque $T_{MG1}$ is adjusted, specifically, as depicted in FIG. 5, the first electric motor torque $T_{MG1}$ is adjusted such that the sum of the engine torque Te and the first electric motor torque $T_{MG1}$ is balanced with the pump torque Tp that is the input-side load torque of the torque converter 16. Since the engine operating point control means 70 basically causes the first electric motor MG1 to perform the electric generation operation in the engine operating point control, the first electric motor torque $T_{MG1}$ is a negative value except the power circulation state. Specifically describing the engine operating point control, first, the engine operating point control means 70 sequentially determines a target engine operating point as an operating point P05 of the engine 12 at which the target engine output Pe* is achieved on an engine minimum fuel consumption rate line $L_{FL}$ determined in advance as depicted in FIG. 9. FIG. 9 is a diagram of the first electric motor torque $T_{MG1}$ and the pump torque Tp when an operating point on the engine minimum fuel consumption rate line $L_{FL}$ is defined as the target engine operating point in the coordinate system same as FIG. 5 under a certain constant turbine rotation speed Nt, and the broken line L01 and the solid line L03 in FIG. 9 are the same as those of FIG. 5. The engine minimum fuel consumption rate line $L_{FL}$ is an operating curve of the engine 12 indicative of relationship between the engine rotation speed Ne and the engine torque Te empirically determined in advance such that the fuel consumption rate of the engine 12 is minimized, or in other words, is a series of fuel efficiency optimum points that are operating points optimal for the fuel efficiency improvement of the engine 12. The target engine output (necessary engine power) Pe* is an output requested by a driver to a vehicle and is sequentially determined by the engine operating point control means 70 based on the accelerator opening degree Acc and the vehicle speed V from relationship empirically determined in advance so as to accommodate the output request from the driver and, for example, the target engine output Pe* is determined to be larger when the accelerator opening degree Acc is larger. If the charge remaining amount SOC of the electric storage device 36 is reduced to a predetermined lower limit value or lower, a charge request is made to indicate that the electric storage device 36 should be charged and, preferably, for the target engine output Pe*, an electric power based on the charge request (required charging power) is added to a calculation value based on the accelerator opening degree Acc and the vehicle speed V.

After determining the target engine operating point (point P05) on the engine minimum fuel consumption rate line $L_{FL}$ as described above, the engine operating point control means 70 calculates the pump torque Tp based on the engine rotation speed Ne indicated by the point P05 and calculates the first electric motor torque $T_{MG1}$ based on the pump torque Tp and the engine torque Te indicated by the point P05 as depicted in FIG. 9. The engine operating point control means 70 then calculates the speed ratio e of the torque converter 16 from the engine rotation speed Ne indicated by the point P05 and the turbine rotation speed Nt.

After calculating the pump torque Tp and the first electric motor torque $T_{MG1}$ based on the target engine operating point (point P05) on the engine minimum fuel consumption rate line $L_{FL}$, since the transmission rate $RTO_{PMC}$ of the mechanical path and the transmission rate $RTO_{PEL}$ of the electric path are respectively obtained from a mechanical path output transmitted through the mechanical path and an electric path output transmitted through the electric path, the engine operating point control means 70 can calculate the combined transmission efficiency $\eta_{CVT}$ based on the speed ratio e and the transmission rates $RTO_{PEL}$ and $RTO_{PMC}$ from the relationship between the speed ratio e and the transmission efficiency $\eta_{MC}$ of the mechanical path empirically obtained and set in advance and the relationship between the speed ratio e and the transmission efficiency $\eta_{EL}$ of the electric path empirically obtained and set in advance, as depicted in FIG. 8. Therefore, the engine operating point control means 70 sequentially calculates the combined transmission efficiency $\eta_{CVT}$.

Along with the calculation of the combined transmission efficiency $\eta_{CVT}$, the engine operating point control means 70 sequentially calculates engine efficiency $\eta_{ENG}$ based on the engine rotation speed Ne and the engine torque Te indicated by the target engine operating point (point P05) on the engine minimum fuel consumption rate line $L_{FL}$, from a relationship (engine efficiency map) empirically obtained and determined in advance between the operating point of the engine 12, which is indicated by the engine rotation speed Ne and the engine torque Te, and the engine efficiency $\eta_{ENG}$. The engine operating point control means 70 also sequentially calculates combined efficiency $\eta_{TOTAL}$, i.e., total efficiency $\eta_{TOTAL}$, acquired as the product of the calculated combined transmission efficiency $\eta_{CVT}$ and the engine efficiency $\eta_{ENG}$. The engine efficiency $\eta_{ENG}$ is a proportion of heat quantity of a lower heating value converted into work when fuel supplied to the engine 12 is completely combusted.

The engine operating point control means 70 switches details of control in the engine operating point control depending on determination of the operation mode determining means 68. Specifically, if the operation mode determining means 68 determines that the system optimum operation mode is selected, the engine operating point control means 70 shifts the operating point of the engine 12 to the side of greater total efficiency $\eta_{TOTAL}$, that is the product of the combined transmission efficiency $\eta_{CVT}$ and the engine efficiency $\eta_{ENG}$.

For example, when shifting the target engine operating point to the side of greater total efficiency $\eta_{TOTAL}$ as described above, the engine operating point control means 70 gradually shifts the target engine operating point on the equal power curve (e.g., the solid line L03 of FIG. 9) indicative of the target engine output Pe* and sequentially calculates the first electric motor torque $T_{MG1}$ as well as the total efficiency $\eta_{TOTAL}$ based on the target engine operating point each time the target engine operating point is shifted. The target engine operating point at the local maximum (preferably the maximum) of the total efficiency $\eta_{TOTAL}$ is determined as the final target engine operating point.

On the other hand, if the operation mode determining means 68 determines that the system optimum operation mode is not selected, the engine operating point control means 70 does not shift the target engine operating point to the side of greater total efficiency $\eta_{TOTAL}$ from the engine minimum fuel consumption rate line $L_{FL}$ as described above and determines the target engine operating point on the engine minimum fuel consumption rate line $L_{FL}$ (point P05 of FIG. 9) as the final target engine operating point.

If the operation mode determining means 68 determines that the system optimum operation mode is selected or that the system optimum operation mode is not selected, when the final target engine operating point is determined, the engine operating point control means 70 sequentially sets the engine rotation speed Ne and the engine torque Te indicated by the final target engine operating point as target values, i.e., a target engine rotation speed Ne* and a target engine torque Te*, respectively, and also sets the first electric motor torque $T_{MG1}$ and the first electric motor rotation speed $N_{MG1}$ (=engine rotation speed Ne) corresponding to the final target engine operating point as target values, i.e., a target first electric motor torque $T_{MG1}$* and a target first electric motor rotation speed $N_{MG1}$*, respectively. The engine operating point control means 70 adjusts the throttle valve opening degree $\theta T_H$ to provide the output control of the engine 12 such that the actual engine torque Te matches, for example, follows, the target engine torque Te* and also controls the first electric motor MG1 such that the actual first electric motor torque $T_{MG1}$ matches (follows) the target first electric motor torque $T_{MG1}$* and that the actual first electric motor rotation speed $N_{MG1}$ matches (follows) the target first electric motor rotation speed $N_{MG1}$*. As described above, the engine operating point control means 70 provides the engine operating point control.

Matching the actual first electric motor rotation speed $N_{MG1}$ with the target first electric motor rotation speed $N_{MG1}$* corresponds to matching the actual engine rotation speed Ne with the target engine rotation speed Ne*.

The engine operating point control means 70 transmits an output torque $T_{MG2}$ of the second electric motor MG2 (hereinafter referred to as second electric motor torque $T_{MG2}$) to the drive wheels 58 in the engine operating point control. Although the engine operating point control means 70 basically supplies electric power generated by the first electric motor MG1 directly to the second electric motor MG2 to drive the second electric motor MG2 in this case, if the charge request is made, the engine operating point control means 70 calculates the target engine output Pe* increased by the required charging power to be stored in the electric storage device 36 in accordance with the charge request and supplies to the second electric motor MG2 a remaining portion of the electric power generated by the first electric motor MG1 after subtracting the electric power to be stored into the electric storage device 36, thereby driving the second electric motor MG2. Since the engine operating point control causes all or a portion of the electric power generated by the first electric motor MG1 to be consumed by the second electric motor MG2, the second electric motor torque $T_{MG2}$ is a torque corresponding to the first electric motor torque $T_{MG1}$ and, if the consumed electric power in the second electric motor MG2 is suppressed, the first electric motor torque $T_{MG1}$ is indirectly suppressed in this relationship. Therefore, in the engine operating point control, the adjustment of the first electric motor torque $T_{MG1}$ may be considered as the adjustment of the power transmitted through the electric path and as the adjustment of the second electric motor torque $T_{MG2}$.

Figure 10:
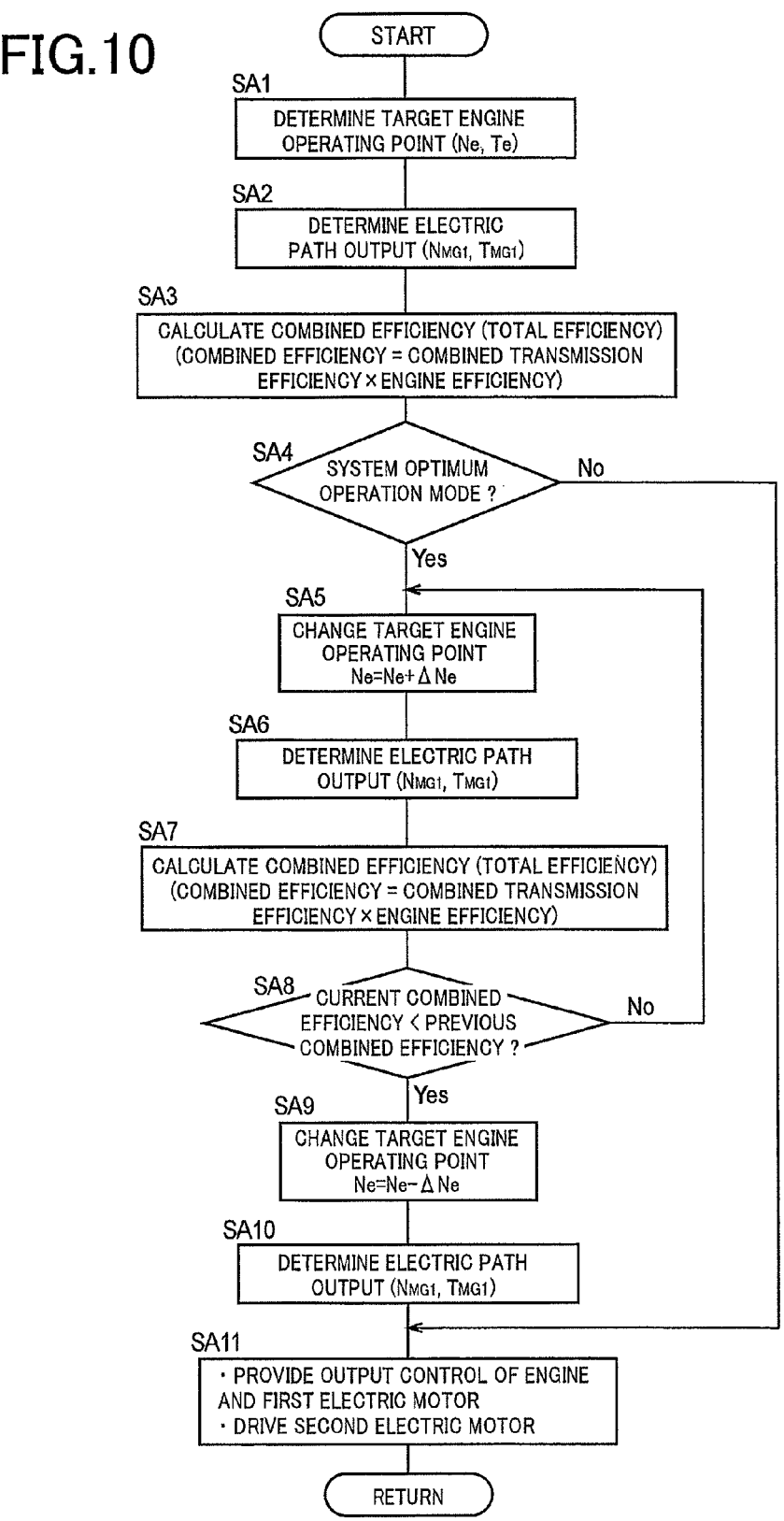
FIG. 10 is a flowchart of a first example for explaining a main portion of the control operation of the electronic control device of FIG. 3, i.e., the control operation of determining the engine operating point by utilizing continuously variable transmission operation of a continuously variable transmission.

FIG. 10 is a flowchart for explaining a main portion of the control operation of the electronic control device 40, i.e., the control operation of determining the operating point of the engine 12 by utilizing the continuously variable transmission operation of the continuously variable transmission 60 and is repeatedly executed with an extremely short cycle time, for example, on the order of a few msec to a few tens of msec. The control operation depicted in FIG. 10 is performed solely or concurrently with another control operation. Steps (hereinafter, "step" will be omitted) SA1 to SA3 and SA5 to SA11 correspond to the engine operating point control means 70 and SA4 corresponds to the operation mode determining means 68.

First, at SA1, the target engine output (necessary engine power) Pe* is calculated based on the accelerator opening degree Acc and the vehicle speed V from a predetermined relationship. The target engine output Pe* may be calculated to be larger by the charging power if the electric storage device 36 is charged, or may be calculated to be smaller by the discharging power if the electric storage device 36 is discharged. At SA1, the target engine operating point is determined as the operating point (e.g., the point P05 of FIG. 9) of the engine 12 at which the calculated target engine output Pe* is achieved on the engine minimum fuel consumption rate line $L_{FL}$ as depicted in FIG. 9. SA1 is followed by SA2.

At SA2, as exemplarily illustrated in FIG. 9, the first electric motor torque $T_{MG1}$ is calculated and determined based on the target engine operating point (e.g., the point P05) determined at SA1. In other words, the electric path output (e.g., in kW) transmitted through the electric path corresponding to the target engine operating point is calculated based on the first electric motor torque $T_{MG1}$ and the first electric motor rotation speed $N_{MG1}$ (=engine rotation speed Ne). The mechanical path output (e.g., in kW) transmitted through the mechanical path corresponding to the target engine operating point is calculated based on the pump torque Tp and the pump rotation speed Np (=engine rotation speed Ne). SA2 is followed by SA3.

At SA3, the combined transmission efficiency $\eta_{CVT}$ based on the target engine operating point determined at SA1 is calculated from the relationship between each of the transmission efficiency $\eta_{MC}$ of the mechanical path and the transmission efficiency $\eta_{EL}$ of the electric path, and the speed ratio e as depicted in FIG. 8 based on the turbine rotation speed Nt detected by the turbine rotation speed sensor 52, the engine rotation speed Ne indicated by the target engine operating point, and the electric path output and the mechanical path output calculated at SA2. The engine efficiency $\eta_{ENG}$ based on the target engine operating point determined at SA1 is also calculated. The product of the combined transmission efficiency $\eta_{CVT}$ and the engine efficiency $\eta_{ENG}$ is calculated as the total efficiency (combined efficiency) $\eta_{TOTAL}$. SA3 is followed by SA4.

At SA4, it is determined whether the system optimum operation mode is selected. If the determination at SA4 is affirmative, i.e., if the system optimum operation mode is selected, the operation goes to SA5. On the other hand, if the determination at SA4 is negative, the operation goes to SA11.

At SA5, the engine rotation speed Ne indicated by the target engine operating point is increased by a predetermined change amount ΔNe to determine a new target engine operating point. This stepwise change in the target engine operating point is made such that the target engine output Pe* calculated at SA1 is not changed. Therefore, the engine torque Te indicated by the target engine operating point is changed along with the change in the engine rotation speed Ne indicated by the target engine operating point. The target engine operating point before the change at SA5 is referred to as a previous target engine operating point and the target engine operating point after the change is referred to as a current target engine operating point. SA5 is followed by SA6.

At SA6, as is the case with SA2, the first electric motor torque $T_{MG1}$ is calculated based on the current target engine operating point, and the electric path output and the mechanical path output corresponding to the current target engine operating point are calculated. SA6 is followed by SA7.

At SA7, as is the case with SA3, the combined transmission efficiency $\eta_{CVT}$ based on the current target engine operating point is calculated and the engine efficiency $\eta_{ENG}$ based on the current target engine operating point is calculated. The product of the combined transmission efficiency $\eta_{CVT}$ and the engine efficiency $\eta_{ENG}$ is calculated as the total efficiency (combined efficiency) $\eta_{TOTAL}$ (referred to as current combined efficiency). Previous combined efficiency, i.e., the total efficiency (combined efficiency) $\eta_{TOTAL}$ based on the previous target engine operating point, is stored in advance for determination at SA8. SA7 is followed by SA8.

At SA8, it is determined whether the previous combined efficiency is greater than the current combined efficiency. If the determination at SA8 is affirmative, i.e., if the previous combined efficiency is greater than the current combined efficiency, the operation goes to SA9. On the other hand, if the determination at SA8 is negative, the operation goes to SA5.

At SA9, the target engine operating point is returned to the previous target engine operating point. In other words, the engine rotation speed Ne indicated by the current target engine operating point determined at SA5 is reduced by the predetermined change amount ΔNe to determine a new target engine operating point. In this case, as is the case with SA5, the engine torque Te indicated by the target engine operating point is also changed, i.e., returned to the previous torque, such that the target engine output Pe* is not changed. SA9 is followed by SA10.

At SA10, as is the case with SA2, the first electric motor torque $T_{MG1}$ is calculated based on the target engine operating point newly determined at SA9, and the electric path output and the mechanical path output corresponding to the target engine operating point newly determined at SA9 are calculated. SA10 is followed by SA11.

At SA11, the output control of the engine 12 and the first electric motor MG1 is provided such that an actual operating point of the engine 12 indicated by the actual engine rotation speed Ne and engine torque Te matches, for example, follows, the finally determined target engine operating point. The second electric motor torque $T_{MG2}$ is transmitted to the drive wheels 58. Although the electric power generated by the first electric motor MG1 is directly supplied to the second electric motor MG2 to drive the second electric motor MG2 in this case, if the electric storage device 36 is charged, the second electric motor MG2 is supplied with a remaining portion of the electric power generated by the first electric motor MG1 after subtracting the electric power to be stored into the electric storage device 36, so as to drive the second electric motor MG2.

This example has the following effects (A1) to (A4). (A1) According to this example, the first electric motor MG1, the second electric motor MG2, and the torque converter 16 make up the continuously variable transmission 60 as a whole and the engine operating point control means 70 provides the engine operating point control in which the first electric motor torque $T_{MG1}$ is adjusted to control the operating point of the engine 12 during the engine running. In the engine operating point control, the second electric motor torque $T_{MG2}$ is transmitted to the drive wheels 58. Therefore, since the continuously variable transmission operation of the continuously variable transmission 60 can be performed by adjusting the first electric motor torque $T_{MG1}$ (basically, regenerative torque) and the continuously variable transmission operation of the continuously variable transmission 60 enables the operating point of the engine 12 to be controlled without being constrained by the turbine rotation speed Nt, the engine 12 can be driven at an operating point optimal for the fuel efficiency improvement (fuel efficiency optimum point), for example, and the vehicle fuel efficiency can be improved.

(A2) According to this example, as depicted in FIG. 5, the engine operating point control means 70 adjusts the first electric motor torque $T_{MG1}$ so that a sum of the engine torque Te and the first electric motor torque $T_{MG1}$ is balanced with the pump torque Tp that is the input-side load torque of the torque converter 16. Therefore, the first electric motor torque $T_{MG1}$ can easily be adjusted based on the characteristics of the torque converter 16.

(A3) According to this example, if the operation mode determining means 68 determines that the system optimum operation mode is selected, the engine operating point control means 70 shifts the operating point of the engine 12 to the side of greater total efficiency $\eta_{TOTAL}$ that is the product of the combined transmission efficiency $\eta_{CVT}$ and the engine efficiency $\eta_{ENG}$. Therefore, as compared to the case that the operating point of the engine 12 is not changed depending on the total efficiency $\eta_{TOTAL}$, the efficiency of the vehicle drive device 10 is increased as a whole and the vehicle fuel efficiency can be improved.

(A4) According to this example, if the operation mode determining means 68 determines that the system optimum operation mode is not selected, the engine operating point control means 70 controls the operating point of the engine 12 such that the operating point of the engine 12 is located along the engine minimum fuel consumption rate line $L_{FL}$ and that the target engine output Pe* is achieved. Therefore, a rise in the fuel consumption rate of the engine 12 can be suppressed by the continuously variable transmission operation of the continuously variable transmission 60.

The torque converter 16 of this example includes the lockup clutch L/C and the power of the engine 12 can directly be transmitted in the mechanical path from the crankshaft 14 to the input shaft 20 without via the fluid in the torque converter 16. Therefore, the transmission efficiency in the mechanical path is improved by putting the lockup clutch L/C into a completely engaged state as compared to the transmission efficiency via the fluid in the torque converter 16. On the contrary, if the lockup clutch L/C is put into the completely engaged state, the engine rotation speed Ne is uniquely constrained by the vehicle speed V and the engine efficiency $\eta_{ENG}$ may be reduced since the engine operating point cannot be driven at the fuel efficiency optimum point. Therefore, the completely engaged state of the lockup clutch L/C may not necessarily lead to the fuel efficiency improvement of the vehicle. The control of the lockup clutch L/C for optimizing the fuel consumption rate of the vehicle will hereinafter be discussed. The transmission efficiency $\eta_{MC}$ of the mechanical path described above represents transmission efficiency via only the fluid in the torque converter 16 in the mechanical path and is clearly distinguished from lockup time transmission efficiency $\eta_{LU}$ that is transmission efficiency in the mechanical path when the lockup clutch L/C is in the completely engaged state.

First, transmission paths to be compared are defined as a combination transmission path that is a first transmission path for transmitting the power of the engine 12 toward the drive wheels 58 by using both the power transmission via the electric path and the power transmission via only the fluid in the torque converter 16 in the mechanical path (i.e., hydraulic transmission) and a lockup transmission path that is a second transmission path for transmitting the power of the engine 12 toward the drive wheels 58 when the lockup clutch L/C is in the completely engaged state in the mechanical path.

Figure 11:
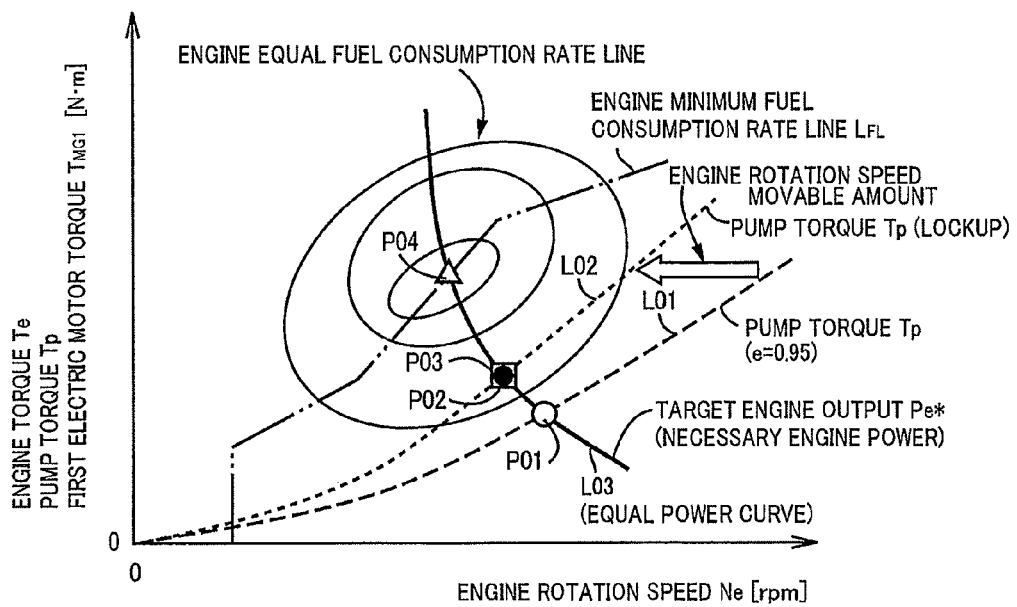
FIG. 11 is a diagram for comparing the engine operating points at the time of the speed ratio close to 1 and the time of lockup in the same coordinate system as FIG. 9.

FIG. 11 is a diagram of respective pump torques Tp at the time of the speed ratio e close to 1 (e.g., e=0.95) and at the time of lockup in the same coordinate system as FIG. 9 and is a diagram for comparing the engine operating points that can be set on the equal power curve. In FIG. 11, a broken line L01 with longer segments indicates the pump torque Tp when the speed ratio e is 0.95 and a broken line L02 with shorter segments indicates the pump torque Tp at the time of lockup (i.e., when the lockup clutch L/C is completely engaged).

When the target engine output Pe* is a solid line L03 (equal power curve L03), an engine operating point P01 (white circle) in the case of the hydraulic transmission only is moved to an engine operating point P03 (square) due to lockup when the lockup transmission path is used. At the time of lockup, the speed ratio e is substantially set to one and, even if the combination transmission path is used, the engine operating point is only moved to an engine operating point P02 (black circle), which is the same engine operating point as that at the time of lockup. Therefore, even when either of the combination transmission path and the lockup transmission path is used, the engine operating point cannot be moved onto the engine minimum fuel consumption rate line $L_{FL}$. This is because the engine rotation speed Ne is hardly set to a lower rotation speed due to the original speed ratio e close to one. Therefore, when the moved engine operation point is the same in either case of using the combination transmission path and the lockup transmission path, the engine efficiency $\eta_{ENG}$ is the same and, thus, the transmission path may be selected that has better transmission efficiency between the transmission efficiency in the combination transmission path, the combined transmission efficiency $\eta_{CVT}$, and the transmission efficiency in the lockup transmission path, i.e., the lockup time transmission efficiency $\eta_{LU}$. If the engine operating point in the case of using the combination transmission path is the same as the engine operating point at the time of lockup, the power transmission via substantially only the electric path is performed in the combination transmission path.

Figure 12:
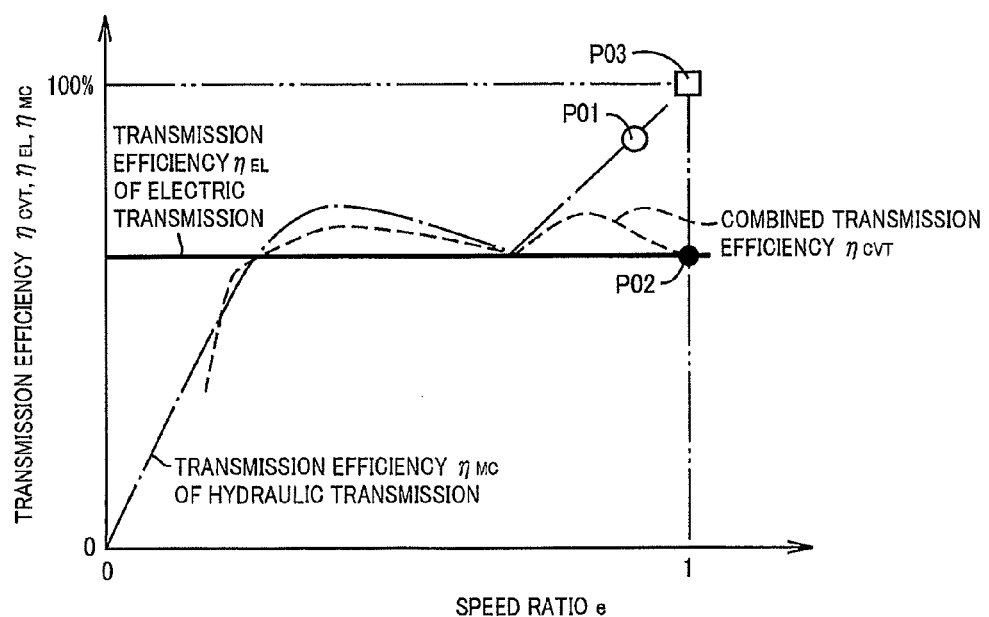
FIG. 12 is a diagram of transmission efficiency in the transmission paths of FIG. 11 in the same coordinate system as FIG. 8.
Figures 13, 14:
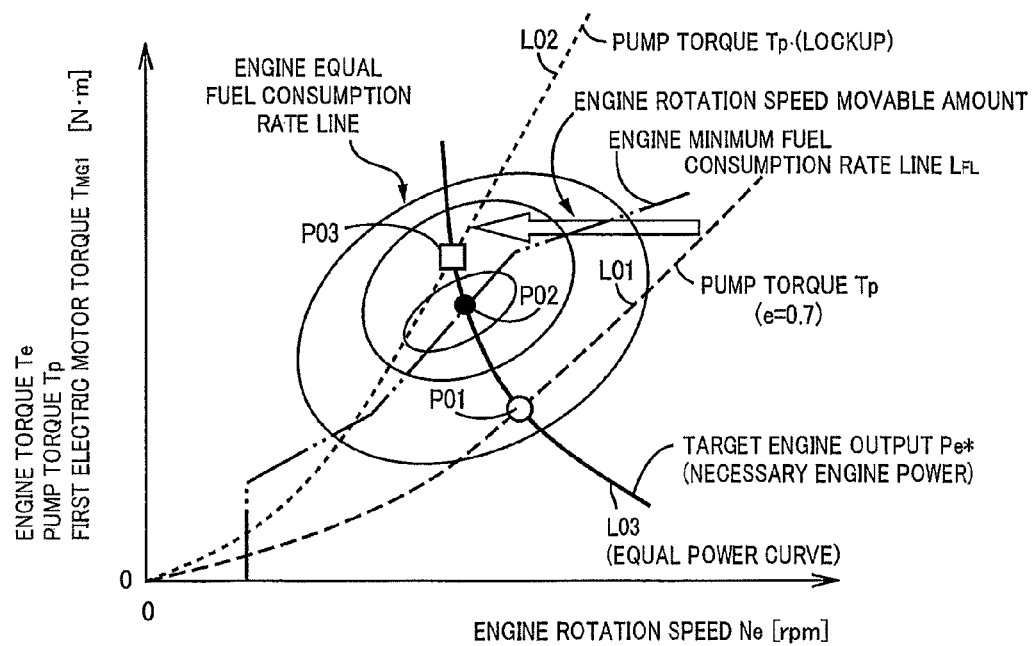
FIG. 13 is a chart summarizing the efficiency of the transmission paths in the example depicted in FIGS. 11 and 12.
FIG. 14 is a diagram for comparing the engine operating points at the time of the speed ratio in a medium level and the time of lockup in the same coordinate system as FIG. 11.

FIG. 12 is a diagram of transmission efficiency in the transmission paths of FIG. 11 in the same coordinate system as FIG. 8. In FIG. 12, points P01 to P03 correspond to the engine operating points P01 to P03, respectively, of FIG. 11. As can be seen, the lockup time transmission efficiency $\eta_{LU}$ in the lockup transmission path is the highest transmission efficiency. FIG. 13 is a chart summarizing the efficiency of the transmission paths in the example depicted in FIGS. 11 and 12 (the example with the speed ratio e close to one). In FIG. 13, when the engine operation point is the same in either case of using the combination transmission path and the lockup transmission path, the best fuel efficiency is acquired by selecting the lockup transmission path having higher transmission efficiency. The speed ratio e is close to one at a lower load when the accelerator opening degree Acc is a lower opening degree, or at a higher vehicle speed. Therefore, a lockup range map for putting the lockup clutch L/C into the completely engaged state in such a case may be obtained and stored in advance.

FIG. 14 is a diagram of respective pump torques Tp at the time of the speed ratio e in a medium level (e.g., e=0.7) and at the time of lockup in the same coordinate system as FIG. 11 and is a diagram for comparing the engine operating points that can be set on the equal power curve. In FIG. 14, a broken line L01 with longer segments indicates the pump torque Tp when the speed ratio e is 0.7 and a broken line L02 with shorter segments indicates the pump torque Tp at the time of lockup (i.e., when the lockup clutch L/C is completely engaged). When the target engine output Pe* is a solid line L03 (equal power curve L03), an engine operating point P01 (white circle) in the case of the hydraulic transmission only is moved to an engine operating point P03 (square) due to lockup when the lockup transmission path is used. When the combination transmission path is used, the engine operating point is moved to an engine operating point P02 (black circle) on the engine minimum fuel consumption rate line $L_{FL}$. Therefore, the engine efficiency $\eta_{ENG}$ is highest when the combination transmission path is used.

Figures 15, 16:
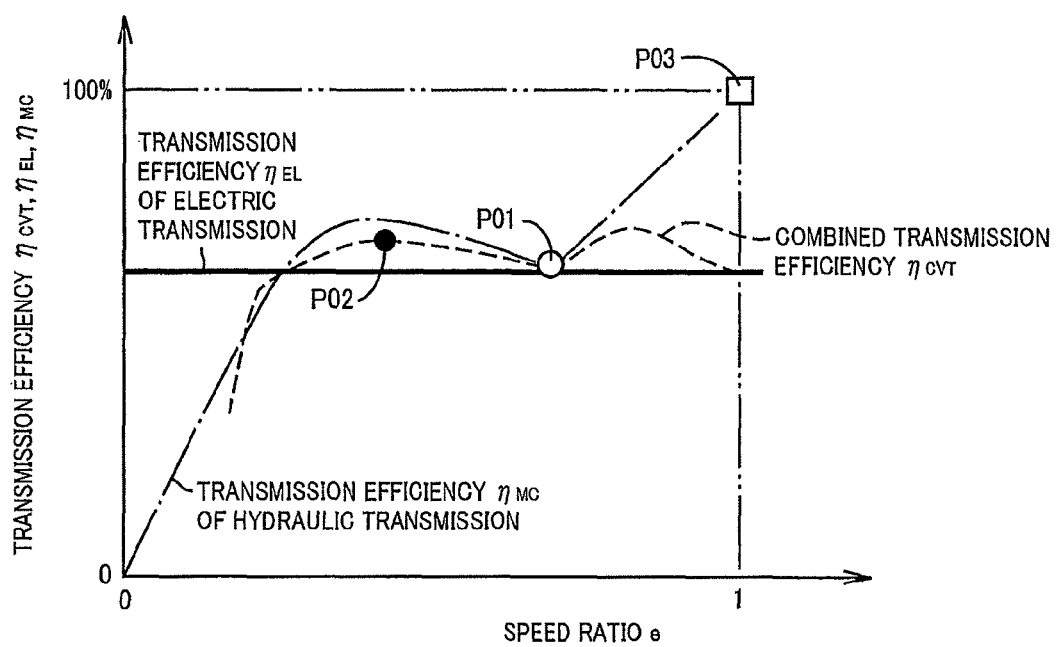
FIG. 15 is a diagram of transmission efficiency in the transmission paths of FIG. 14 in the same coordinate system as FIG. 12.
FIG. 16 is a chart summarizing the efficiency of the transmission paths in the example depicted in FIGS. 14 and 15.

FIG. 15 is a diagram of transmission efficiency in the transmission paths of FIG. 14 in the same coordinate system as FIG. 12. In FIG. 15, points P01 to P03 correspond to the engine operating points P01 to P03, respectively, of FIG. 14. As can be seen, the lockup time transmission efficiency $\eta_{LU}$ in the lockup transmission path is the highest transmission efficiency. FIG. 16 is a chart summarizing the efficiency of the transmission paths in the example depicted in FIGS. 14 and 15 (the example with the speed ratio e in the medium level). In FIG. 16, when the lockup transmission path is used, the vehicle speed V and a required amount at this point determine how far the engine operating point is away from the engine minimum fuel consumption rate line $L_{FL}$ during lockup. Therefore, if the lockup transmission path is used, the engine efficiency $\eta_{ENG}$ varies depending on the target engine output Pe*. If the combination transmission path is used, the engine operating point can arbitrarily be moved by the continuously variable transmission action of the continuously variable transmission 60 to improve the engine efficiency $\eta_{ENG}$; however, the combined transmission efficiency $\eta_{CVT}$ varies. Therefore, if the engine operating point is differentiated between when the combination transmission path is used and when the lockup transmission path is used, the transmission path may be selected that has better total efficiency represented by the product of the engine efficiency $\eta_{ENG}$ at each of the engine operating points and the transmission efficiency of each transmission path. Therefore, the transmission path may be selected that has better total efficiency between the total efficiency $\eta_{TOTAL}$ when the combination transmission path is used and lockup time total efficiency $\eta_{LUTOTAL}(=\eta_{LU} \times \eta_{ENG})$ when the lockup transmission path is used. As is the case with the example depicted in FIGS. 11 and 12, a lockup range map for putting the lockup clutch L/C into the completely engaged state may be obtained and stored in advance.

Figure 17:
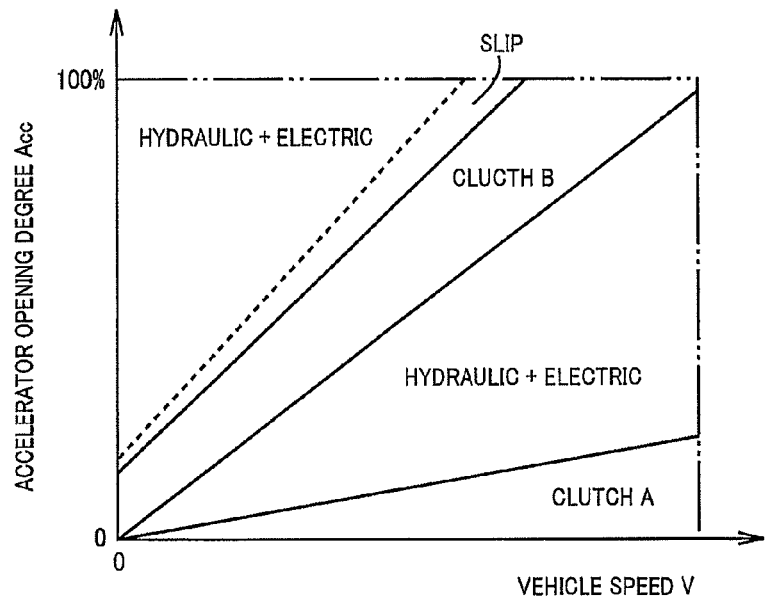
FIG. 17 is a diagram of an example of a lockup range map obtained and stored in advance so as to reflect the examples depicted in FIGS. 11 to 16.

FIG. 17 is a diagram of an example of the lockup range map obtained and stored in advance for selecting a transmission path with better efficiency so as to reflect the examples depicted in FIGS. 11 to 16, i.e., to optimize the fuel consumption rate of the vehicle. In FIG. 17, the lockup range map has ranges for determining the operation of the lockup clutch L/C set within two-dimensional coordinates of a vehicle speed axis and a required output torque axis (or accelerator opening degree axis etc.). In FIG. 17, the ranges indicated by "clutches A and B" are ranges for putting the lockup clutch L/C into the completely engaged state so as to use the lockup transmission path. The ranges indicated by "hydraulic+electric" are ranges for putting the lockup clutch L/C into the released state so as to use the combination transmission path. In FIG. 17, for example, as in the example depicted in FIGS. 11 to 13, the range of a low-load high-vehicle-speed range is defined as the range of "clutch A". For example, in the example depicted in FIGS. 14 to 16, when the lockup clutch L/C is put into the completely engaged state, if the engine operating point is moved onto or into the vicinity of the engine minimum fuel consumption rate line $L_{FL}$, the engine efficiency $\eta_{ENG}$ is equivalent to that of the case of using the combination transmission path and, therefore, the lockup transmission path is selected. In FIG. 17, this corresponds to the range of "clutch B". When the lockup clutch L/C is put into a slip state, the lockup time transmission efficiency $\eta_{LU}$ is reduced as compared to the completely engaged state; however, the engine efficiency $\eta_{ENG}$ can be improved in an expanded range by shifting the engine operating point. An effect of reducing vibration noise is also expected. Therefore, slip control may be provided in the range for putting the lockup clutch L/C into the completely engaged state. As indicated by "slip" of FIG. 17, a range for achieving the slip state may be set next to the range of "clutch B".

As described above, the operation of the lockup clutch L/C may be controlled in accordance with the lockup range map as depicted in FIG. 17. However, the operation of the lockup clutch L/C should be limited in some vehicle states. Therefore, in this example, if the operation of the lockup clutch L/C is limited, the lockup clutch L/C is actuated in preference to the control according to the lockup range map. Specifically, if the operation oil of the automatic transmission 18 and the lockup clutch L/C is at a relatively high oil temperature, it is desirable to put the lockup clutch L/C into the completely engaged state so as to cool the operating oil. On the other hand, if the operating oil is at a relatively low oil temperature, it is desirable to put the lockup clutch L/C into the released state so as to facilitate warming-up of equipment (e.g., the automatic transmission 18) through which the operating oil flows. If the operating oil is at a relatively low oil temperature, the drivability may deteriorate due to deterioration of controllability at the time of slip operation of the lockup clutch L/C and, therefore, it is desirable to inhibit the slip state of the lockup clutch L/C. In this example, if the operating oil temperature $TH_{OIL}$ is relatively high, priority is given to driving the lockup clutch L/C to perform the engagement operation and, on the other hand, if the operating oil temperature $TH_{OIL}$ is relatively low, priority is given to driving the lockup clutch L/C to perform the release operation or priority is given to inhibiting only the slip operation of the lockup clutch L/C.

More specifically, returning to FIG. 3, the electronic control device 40 further includes a lockup control range determining means 72 as a lockup control range determining portion and a lockup control means 74 as a lockup control portion.

The lockup control range determining means 72 determines whether the operation of the lockup clutch L/C is in a limited state. For example, the lockup control range determining means 72 determines whether the operation of the lockup clutch L/C is in a limited state, based on whether the operating oil temperature $TH_{OIL}$ is higher than a predetermined high oil temperature. The lockup control range determining means 72 determines whether the operation of the lockup clutch L/C is in a limited state, based on whether the operating oil temperature $TH_{OIL}$ is lower than a predetermined low oil temperature. The predetermined high oil temperature is a high oil temperature determination value obtained and stored in advance for determining that the operating oil temperature $TH_{OIL}$ is so high that priority must be given to cooling of the operating oil over the fuel efficiency improvement. The predetermined low oil temperature is a low oil temperature determination value obtained and stored in advance for determining that the operating oil temperature $TH_{OIL}$ is so low that warming-up of the automatic transmission 18 must be more facilitated than the fuel efficiency improvement. The predetermined low oil temperature is a low oil temperature determination value obtained and stored in advance for determining that the operating oil temperature $TH_{OIL}$ is so low that the controllability of the lockup clutch L/C at the time of slip operation is deteriorated.

If the lockup control range determining means 72 determines that the operation of the lockup clutch L/C is not in the limited state, the lockup control means 74 determines the operation of the lockup clutch L/C based on the actual vehicle speed V and the accelerator opening degree Acc from the lockup range map as depicted in FIG. 17, for example, and controls the lockup clutch L/C such that the determined operation is achieved. On the other hand, if the lockup control range determining means 72 determines that the operation of the lockup clutch L/C is in the limited state, for example, the lockup control means 74 controls the operation of the lockup clutch L/C in preference to controlling the lockup clutch L/C in accordance with the lockup range map. For example, if the lockup control range determining means 72 determines that the operating oil temperature $TH_{OIL}$ is higher than the predetermined high oil temperature, the lockup control means 74 puts the lockup clutch L/C into the completely engaged state. On the other hand, if the lockup control range determining means 72 determines that the operating oil temperature $TH_{OIL}$ is lower than the predetermined low oil temperature, the lockup control means 74 puts the lockup clutch L/C into the released state or refrains from putting the lockup clutch L/C into the slip state.

Figure 18:
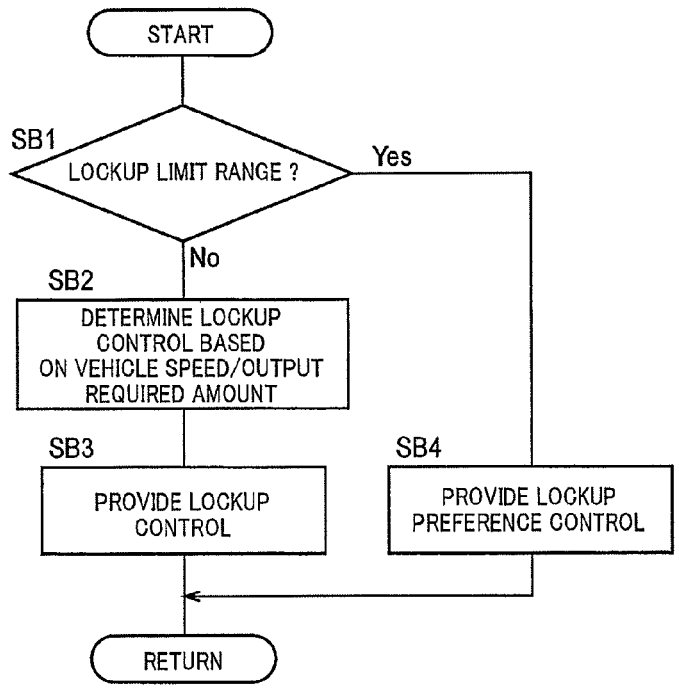
FIG. 18 is a flowchart of the first example for explaining a main portion of the control operation of the electronic control device of FIG. 3, i.e., the control operation of further improving the fuel efficiency of the vehicle when the engine operating point is controlled by adjusting the first electric motor torque.

FIG. 18 is a flowchart for explaining a main portion of the control operation of the electronic control device 40, i.e., the control operation of further improving the fuel efficiency of the vehicle when the engine operating point is controlled by adjusting the first electric motor torque $T_{MG1}$ and is repeatedly executed with an extremely short cycle time, for example, on the order of a few msec to a few tens of msec. The control operation depicted in FIG. 18 is performed solely or concurrently with another control operation. Step (hereinafter, "step" will be omitted) SB1 corresponds to the lockup control range determining means 72 and SB2 to SB4 correspond to the lockup control means 74.

First, at SB1, for example, it is determined, for example, based on the operating oil temperature $TH_{OIL}$, whether the operation of the lockup clutch L/C is in a limited state. If the determination at SB1 is negative, i.e., if the operation of the lockup clutch L/C is not in a limited state, the operation goes to SB2. On the other hand, if the determination at SB1 is positive, i.e., if the operation of the lockup clutch L/C is in a limited state, the operation goes to SB4.

At SB2, the operation (i.e., any one of the completely engaged state, the slip state, and the released state) of the lockup clutch L/C is determined based on the actual vehicle speed V and the accelerator opening degree Acc from the lockup range map as depicted in FIG. 17, for example.

At SB3, the lockup clutch L/C is controlled such that the operation determined at SB2 is achieved. For example, in this control, if it is advantageous in terms of total fuel efficiency to use the combination transmission path for setting the engine operating point at the fuel efficiency optimum point rather than putting the lockup clutch L/C into the completely engaged state (or the slip state), the lockup clutch L/C is put into the released state. If it is advantageous in terms of total fuel efficiency to use the lockup transmission path for moving the engine operating point such that the transmission efficiency is improved even though the engine efficiency $\eta_{ENG}$ is somewhat reduced, the lockup clutch L/C is put into the completely engaged state (or the slip state).

At SB4, the operation of the lockup clutch L/C is forcibly controlled regardless of fuel efficiency improvement. For example, if the operating oil temperature $TH_{OIL}$ is higher than the predetermined high oil temperature, priority is given to putting the lockup clutch L/C into the completely engaged state and the operating oil is cooled. On the other hand, if the operating oil temperature $TH_{OIL}$ is lower than the predetermined low oil temperature, the lockup clutch L/C is put into the released state or only the slip state of the lockup clutch L/C is inhibited and the warming-up of the automatic transmission 18 is facilitated while avoiding deterioration of the drivability due to deterioration of controllability of the lockup clutch L/C.

As described above, according to this example, since a transmission path is selected that has better transmission efficiency between the transmission efficiency (combined transmission efficiency $\eta_{CVT}$) in the combination transmission path (electric path+mechanical path using only the hydraulic transmission) and the transmission efficiency (lockup time transmission efficiency $\eta_{LU}$) in the lockup transmission path, when the engine operating point can be controlled by adjusting the first electric motor torque $T_{MG1}$, further fuel efficiency improvement of the vehicle can be achieved.

According to this example, if the engine operating point is differentiated between when the combination transmission path is used and when the lockup transmission path is used, the transmission path is selected that has better total efficiency between the total efficiency $\eta_{TOTAL}$ in the combination transmission path and the lockup time total efficiency $\eta_{LUTOTAL}$ in the lockup transmission path and, therefore, when the engine operating point can be controlled by adjusting the first electric motor torque $T_{MG1}$, further fuel efficiency improvement of the vehicle can properly be achieved.

According to this example, if the operation of the lockup clutch L/C is limited, the lockup clutch L/C is actuated in preference to selecting the transmission path having better transmission efficiency (or total efficiency) and, therefore, the operation of the lockup clutch L/C is certainly limited.

According to this example, if the operating oil temperature $TH_{OIL}$ is relatively high, priority is given to driving the lockup clutch L/C to perform the engagement operation and, on the other hand, if the operating oil temperature $TH_{OIL}$ is relatively low, priority is given to driving the lockup clutch L/C to perform the release operation or priority is given to inhibiting only the slip operation of the lockup clutch L/C and, therefore, if the operating oil temperature $TH_{OIL}$ is relatively high, the engagement operation of the lockup clutch L/C is performed to cool the operating oil and, on the other hand, if the operating oil temperature $TH_{OIL}$ is relatively low, the release operation of the lockup clutch L/C is performed or only the slip operation of the lockup clutch L/C is inhibited for promoting the warming-up of the equipment through which the operating oil flows and avoiding deterioration of the drivability due to deterioration of controllability of the lockup clutch L/C itself.

Another example of the present invention will be described. In the description of the following example, the mutually overlapping portions of the examples are denoted by the same reference numerals and will not be described.

Second Example

It is described in the example that if the power transmission in the combination transmission path generates the power circulation state in which the first electric motor MG1 consumes electric power while the second electric motor MG2 generates electricity, the combined transmission efficiency $\eta_{CVT}$ is significantly reduced (see FIG. 8). Therefore, in this example, when the power circulation state is generated by the power transmission in the combination transmission path, the lockup clutch L/C is put into the completely engaged state or the slip state to reduce or avoid the power circulation state. However, although the transmission efficiency is improved by using the lockup transmission path, the engine operating point more easily comes away from the engine minimum fuel consumption rate line $L_{FL}$ and the engine efficiency $\eta_{ENG}$ tends to decrease. Therefore, if the power circulation state is generated, a running state reducing or avoiding the power circulation state must properly be ascertained rather than always putting the lockup clutch L/C into the completely engaged state or the slip state. The running state reducing or avoiding the power circulation state will hereinafter be discussed.

Figure 19:
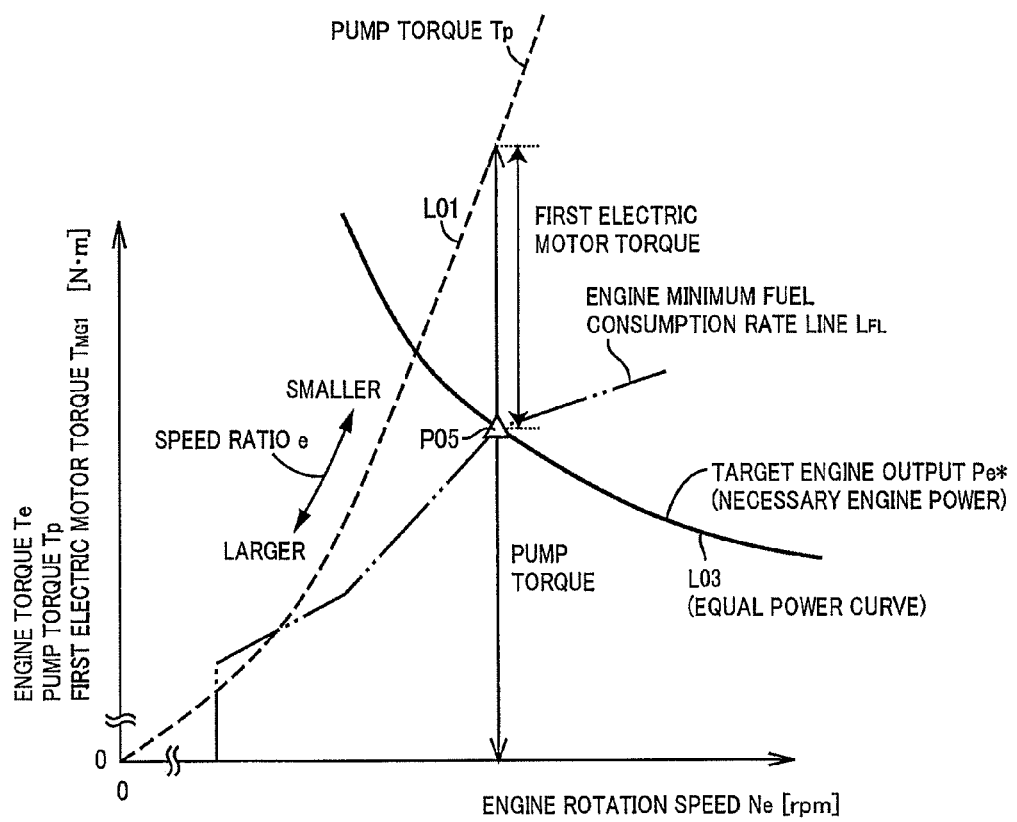
FIG. 19 is a diagram of the first electric motor torque and the pump torque if a power circulation state is generated in the coordinate system same as FIG. 9.

FIG. 19 is a diagram of the first electric motor torque $T_{MG1}$ and the pump torque Tp if the power circulation state is generated when an operating point on the engine minimum fuel consumption rate line $L_{FL}$ is defined as the target engine operating point in the coordinate system same as FIG. 9 under a certain constant turbine rotation speed Nt. In FIG. 19, the pump torque Tp is a total torque acquired by adding the first electric motor torque $T_{MG1}$ (>0) in the power running state to the engine torque Te at the engine operating point P05 at which the target engine output Pe* is achieved on the engine minimum fuel consumption rate line $L_{FL}$, and the power circulation state is generated. If the pump torque Tp is larger than the engine torque Te at the engine operating point P05, the power circulation state is achieved. If the pump torque Tp is smaller than the engine torque Te at the engine operating point P05 as depicted in FIG. 9, the pump torque Tp is a total torque acquired by adding the first electric motor torque $T_{MG1}$ (<0) in the electric generation state to the engine torque Te at the engine operating point P05, a power shunt state is achieved in which the first electric motor MG1 generates electricity while the second electric motor MG2 consumes electric power. As described above, the value of the pump torque Tp determines whether the power shunt state or the power circulation state is generated.

Figure 20:
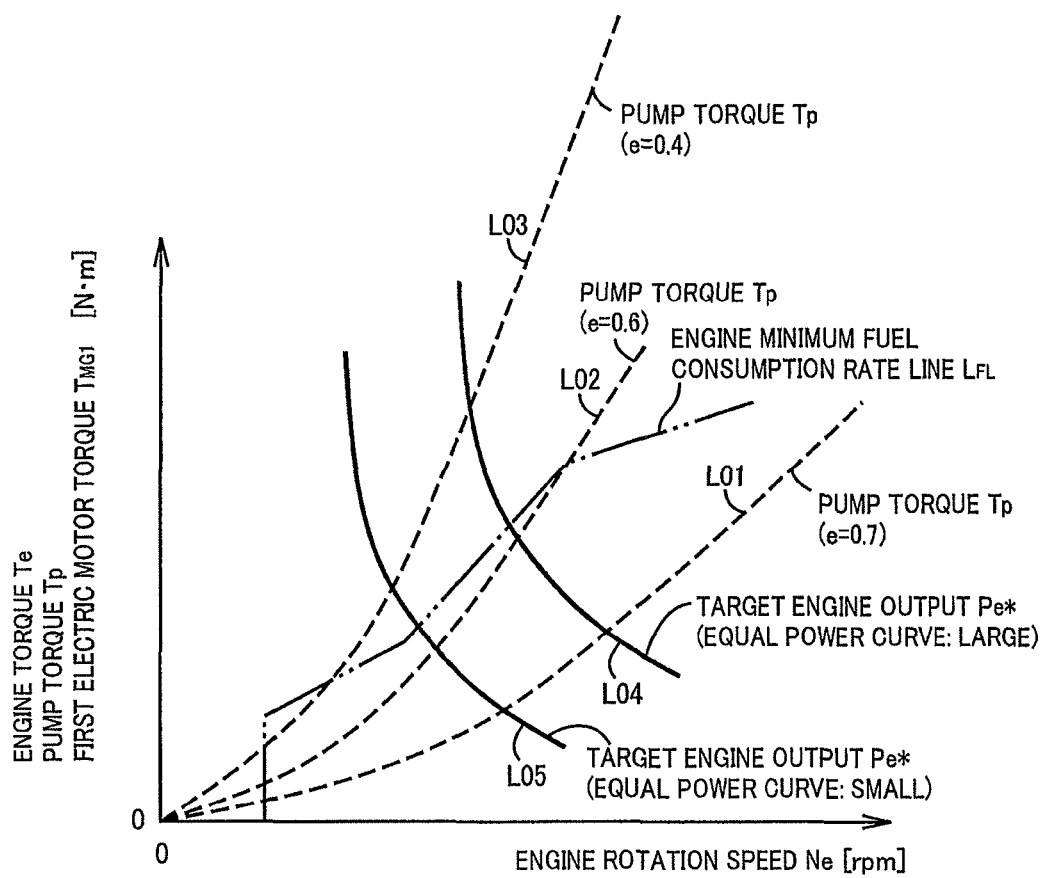
FIG. 20 is a diagram of pump torques of respective speed ratios in the coordinate system same as FIG. 11.

FIG. 20 is a diagram of pump torques Tp of respective speed ratios e in the coordinate system same as FIG. 11. As can be seen in FIG. 20, if the target engine operating point is defined as the engine operating point at which the target engine output Pe* is achieved on the engine minimum fuel consumption rate line $L_{FL}$, the power circulation state is generated when the pump torque Tp is located on the higher torque side as compared to the engine minimum fuel consumption rate line $L_{FL}$. In other words, the power circulation state is more easily generated when the speed ratio e is smaller. Therefore, when the speed ratio e is smaller, the lockup clutch L/C may be put into the completely engaged state or the slip state to reduce or avoid the power transmission via the electric path. Additionally, the lockup clutch L/C may be put into the completely engaged state or the slip state in consideration of a reduction in the engine efficiency $\eta_{ENG}$ when the lockup clutch L/C is put into the completely engaged state or the slip state.

Figure 21:
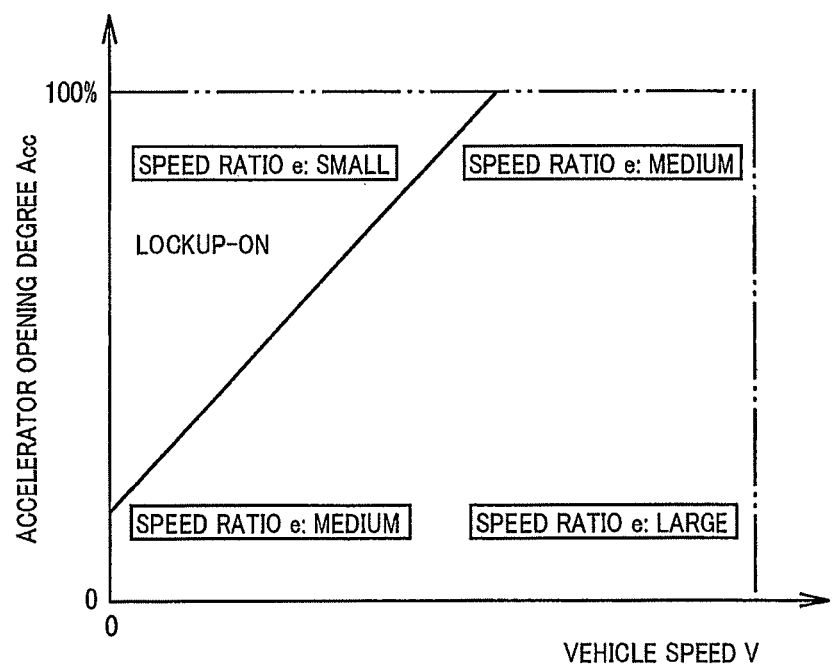
FIG. 21 is a diagram of an example of a lockup range map acquired by preliminarily defining and storing a running state in which the power circulation state should be avoided.

FIG. 21 is a diagram of an example of a relationship (lockup range map B) acquired by preliminarily defining and storing a running state in which the power circulation state should be avoided, based on the deterioration of the engine efficiency $\eta_{ENG}$ associated with movement of the engine operating point due to putting the lockup clutch into the completely engaged state or the slip state and the improvement in transmission efficiency due to putting the lockup clutch into the completely engaged state or the slip state, so as to reflect the concept at the time of putting the lockup clutch L/C into the completely engaged state or the slip state described above. In FIG. 21, the lockup range map B has ranges for determining the complete engagement or the slip engagement of the lockup clutch L/C set in the two-dimensional coordinates of a vehicle speed axis and a required output torque axis (or accelerator opening degree axis etc.). In FIG. 21, the range indicated by "lockup-on" is a range for putting the lockup clutch L/C into the completely engaged state or the slip state. In the lockup range map B of FIG. 21, the "lockup-on" range is set such that the lockup clutch L/C is put into the completely engaged state or the slip state when the speed ratio e is relatively small.

More specifically, returning to FIG. 3, the lockup control range determining means 72 determines, for example, during vehicle running using the combination transmission path, whether the vehicle is in a running state in which the lockup clutch L/C should be put into the completely engaged state or the slip state, based on the vehicle speed V and the accelerator opening degree Acc used as the actual running state from the lockup range map B as depicted in FIG. 21. It can be said that when it is determined whether the vehicle is in a running state in which the lockup clutch L/C should be put into the completely engaged state or the slip state during the vehicle running using the combination transmission path, this determination is to determine whether the operation of the lockup clutch L/C is in the limited state.

If the lockup control range determining means 72 determines that the vehicle is in a running state in which the lockup clutch L/C should be put into the completely engaged state or the slip state, the lockup control means 74 puts the lockup clutch L/C to the completely engaged state or the slip state.

Figure 22:
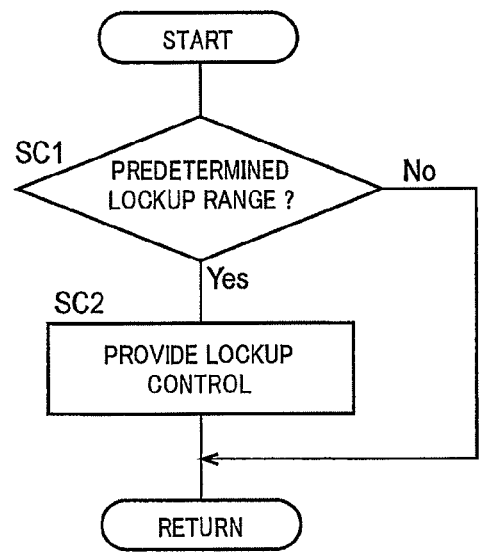
FIG. 22 is a flowchart of a second example for explaining a main portion of the control operation of the electronic control device of FIG. 3, i.e., the control operation of further improving the fuel efficiency of the vehicle when the engine operating point is controlled by adjusting the first electric motor torque.

FIG. 22 is a flowchart for explaining a main portion of the control operation of the electronic control device 40, i.e., the control operation of further improving the fuel efficiency of the vehicle when the engine operating point is controlled by adjusting the first electric motor torque $T_{MG1}$ and is repeatedly executed with an extremely short cycle time, for example, on the order of a few msec to a few tens of msec. The control operation depicted in FIG. 22 is performed solely or concurrently with another control operation. Step (hereinafter, "step" will be omitted) SC1 corresponds to the lockup control range determining means 72 and SC2 corresponds to the lockup control means 74.

First, at SC1, for example, during the vehicle running using the combination transmission path, it is determined whether the vehicle is in a running state (i.e., a predetermined lockup range) in which the lockup clutch L/C should be put into the completely engaged state or the slip state, based on the actual vehicle speed V and the accelerator opening degree Acc from the lockup range map B as depicted in FIG. 21. If the determination at SC1 is negative, i.e., if the vehicle is not in the predetermined lockup range, this routine is terminated. On the other hand, if the determination at SC1 is affirmative, i.e., if the vehicle is in the predetermined lockup range, the operation goes to SC2. At SC2, the lockup clutch L/C is put into the completely engaged state or the slip state.

As described above, according to this example, when the power circulation state is generated by the power transmission in the combination transmission path, the lockup clutch L/C is driven to perform the engagement or slip operation so as to reduce or avoid the power circulation state and, therefore, although the generation of the power circulation state considerably increases an electric loss in the case of transmission via the electric path, resulting in considerable reduction in the combined transmission efficiency $\eta_{CVT}$ in the combination transmission path, since the lockup clutch L/C is driven to perform the engagement or slip operation so as to reduce chances of generating the power circulation state, the reduction in transmission efficiency can be restrained and the fuel efficiency deterioration of the vehicle can be suppressed.

According to this example, since the lockup clutch L/C is driven to perform the engagement or slip operation when the actual running state is a running state in which a power circulation state should be avoided predetermined based on the deterioration of the engine efficiency $\eta_{ENG}$ associated with movement of the engine operating point due to the engagement or slip operation of the lockup clutch L/C and the improvement in transmission efficiency due to the engagement or slip operation of the lockup clutch L/C, the lockup clutch L/C is properly driven to perform the engagement or slip operation such that the increase in electric loss associated with the generation of the power circulation state is suppressed, and the fuel efficiency deterioration of the vehicle can be properly suppressed.

Although the examples of the present invention have been described in detail with reference to the drawings, the present invention is not limited to the examples and can be implemented in other forms.

For example, although the automatic transmission 18 is a stepped transmission in the first and second examples, the automatic transmission 18 may be a continuously variable transmission (CVT) capable of continuously varying the gear ratio $\gamma_{AT}$.

Figure 23:
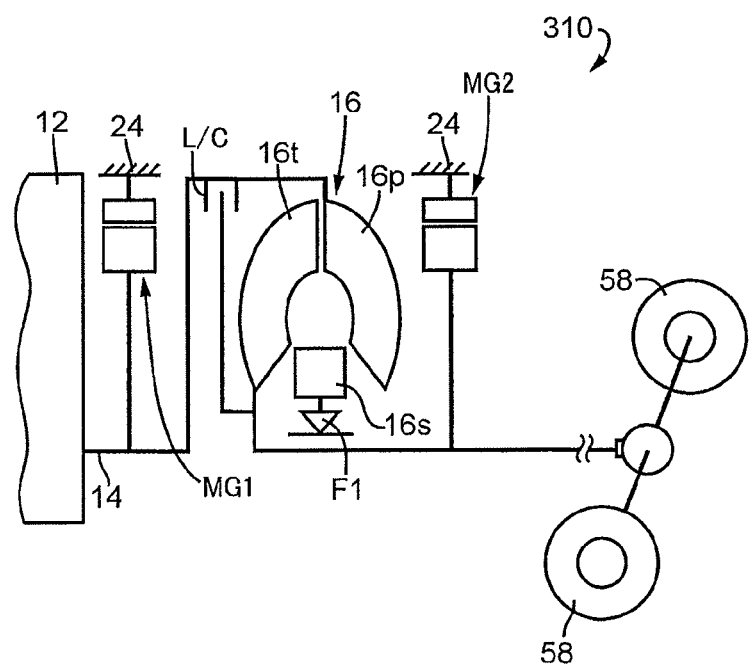
FIG. 23 is a schematic for explaining a configuration of a vehicle drive device different from that of FIG. 1 and is a schematic for explaining a configuration of a vehicle drive device without an automatic transmission.

Although the vehicle drive device 10 includes the automatic transmission 18 subjected to the automatic shift control in the first and second examples, a configuration without the automatic transmission 18 may be conceivable as in the case of a vehicle drive device 310 depicted in FIG. 23, for example.

Although the first electric motor MG1 is driven to perform regenerative operation and the first electric motor torque $T_{MG1}$ is generated in the negative rotation direction in the engine operating point control in the first example, the power circulation state may be permitted such that the first electric motor MG1 consumes electric power while the second electric motor MG2 generates electricity, i.e., the first electric motor torque $T_{MG1}$ may be generated in the positive rotation direction in some cases.

In the first and second examples, the second electric motor MG2 is coupled to the input shaft 20 of the automatic transmission 18 as depicted in FIG. 1 and, therefore, the second electric motor MG2 is indirectly coupled via the automatic transmission 18 to the drive wheels 58; however, the second electric motor MG2 may be coupled to the output shaft 22 instead of the input shaft 20. If the second electric motor MG2 is coupled to the output shaft 22 in this way, the second electric motor MG2 and the drive wheels 58 rotate in one-to-one relationship without interruption of power transmission and, therefore, it can be said that the second electric motor MG2 is directly coupled to the drive wheels 58. The second electric motor MG2 may be a wheel-in motor built into the drive wheels 58. In this case, a total of the two second electric motors MG2 is disposed in the left and right drive wheels 58.

In the first and second examples, the second electric motor MG2 is coupled to the drive wheels 58 that are rear wheels indirectly coupled to the engine 12 as depicted in FIG. 1; however, the engine 12 and the first electric motor MG1 may be coupled to the rear wheels as depicted in FIG. 1 while the second electric motor MG2 may directly or indirectly be coupled to front wheels instead of the rear wheels. If the second electric motor MG2 is coupled to the front wheels in this way, the front wheels are included in drive wheels. In short, the drive wheels driven by the power from the engine 12 may be wheels different from the drive wheels driven by the power from the second electric motor MG2.

Although the first electric motor torque $T_{MG1}$ is adjusted in the engine operating point control, i.e., the continuously variable transmission operation of the continuously variable transmission 60 described in the first and second examples, the first electric motor torque $T_{MG1}$ may directly be adjusted or may be adjusted as a result of adjustment of the second electric motor torque $T_{MG2}$, i.e., adjustment of the output of the second electric motor MG2, or in other words, in an indirect manner.

In the first and second examples, the power transmission is electrically performed through the electric path by giving and receiving electric power between the first electric motor MG1 and the second electric motor MG2; however, for example, the electric power generated by the first electric motor MG1 may directly be supplied to the second electric motor MG2 without via the electric storage device 36 or the electric power generated by the first electric motor MG1 may indirectly be supplied to the second electric motor MG2 in such a manner that the electric power generated by the first electric motor MG1 is once stored in the electric storage device 36 and then supplied from the electric storage device 36 to the second electric motor MG2. The same applies to the time of the power circulation.

In the first and second examples, the power transmission is electrically performed through the electric path in the engine operating point control by giving and receiving electric power between the first electric motor MG1 and the second electric motor MG2; however, for example, the second electric motor MG2 may be driven by the supply of electric power from the electric storage device 36 or the supply of electric power from the electric storage device 36 along with electric power generated by the first electric motor MG1. The same applies to the electric power supply to the first electric motor MG1 in the case of power running of the first electric motor MG1 at the time of the power circulation.

Although the first electric motor MG1 is directly coupled to the pump impeller 16p of the torque converter 16 as depicted in FIG. 1 in the first and second examples, the first electric motor MG1 may indirectly be coupled to the pump impeller 16p via a transmission, a clutch, or an electric belt, or the like.

Although the vehicle drive device 10 includes the electric storage device 36 in the first and second examples, the electric storage device 36 may not be included.

Although SA3 is followed by SA4 in the flowchart of FIG. 10 in the first example, either of these steps may come first and, for example, in the flowchart, after SA2 is followed by SA4, if the determination at SA4 is affirmative, the operation may go to SA3, and SA3 may be followed by SA5.

Although the engine rotation speed Ne indicated by the target engine operating point is increased by the predetermined change amount ΔNe to determine a new target engine operating point at SA5 of the flowchart of FIG. 10 in the first example, the engine rotation speed Ne may be decreased by the predetermined change amount ΔNe to determine a new target engine operating point. In such a case, at SA9 of FIG. 10, the engine rotation speed Ne indicated by the current target engine operating point determined at SA5 is increased by the predetermined change amount ΔNe to determine a new target engine operating point.

With regard to the flowchart depicted in FIG. 10 of the first example, it is conceivable that the flowchart may not include steps SA3 to SA10 so that SA11 is executed after SA2.

Although the target engine operating point is set on the engine minimum fuel consumption rate line $L_{FL}$ as indicated by, for example, the point P05 in FIGS. 9 and 19 in the first and second examples, it is conceivable that the target engine operating point is set out of the engine minimum fuel consumption rate line $L_{FL}$.

Although the vehicle can perform the motor running in the first and second examples, the vehicle may always run by performing the engine running.

Although the automatic transmission 18 is shifted to Rev1 or Rev2 depicted in FIG. 2 and the input shaft 20 of the automatic transmission 18 is rotated in the positive rotation direction when the vehicle is caused to run backward in the first and second examples, the vehicle may be caused to run backward by shifting the automatic transmission 18 to any one of 1st to 8th depicted in FIG. 2 and driving the second electric motor MG2 in the negative rotation direction.

Although the vehicle drive device 10 includes the torque converter 16 as a hydraulic power transmission device in the first and second examples, a fluid coupling may be disposed instead of the torque converter 16.

In the first and second examples, the vehicle drive devices 10 and 310 are not limited to those used in FR (front-engine rear-drive) type vehicles and may be those used in vehicles of other drive types.

Although the transmission rates $RTO_{PEL}$ and $RTO_{PMC}$ of the electric path and the mechanical path are not changed stepwise as depicted in FIG. 6 in the continuously variable transmission operation of the continuously variable transmission 60 in the first and second examples, since the transmission efficiency $\eta_{EL}$ of the electric path is higher than the transmission efficiency $\eta_{MC}$ of the mechanical path in the lower speed ratio range relative to the speed ratio indicated by the intersection point between the dashed-dotted line and the solid line as depicted in FIG. 8 while the transmission efficiency $\eta_{MC}$ of the mechanical path is higher than the transmission efficiency $\eta_{EL}$ of the electric path in the higher speed ratio range, for example, the power transmission may be performed through only the electric path in the lower speed ratio range and the power transmission may be performed through only the mechanical path in the higher speed ratio range.

In the first example, if the operation mode determining means 68 determines that the system optimum operation mode is selected, the engine operating point control means 70 shifts the operating point of the engine 12 to the side of greater total efficiency $\eta_{TOTAL}$; however, instead of the total efficiency $\eta_{TOTAL}$, the operating point of the engine 12 may be shifted based on a total loss $LSS_{TOTAL}$ acquired by summing a power transmission loss $LSS_{CVT}$ when the power from the engine 12 is transmitted through the electric path and the mechanical path and a loss $LSS_{ENG}$ of the engine 12 (hereinafter referred to as an engine loss $LSS_{ENG}$). Specifically, the operating point of the engine 12 may be shifted to the side of a smaller total loss $LSS_{TOTAL}$. In this case, as compared to the case that the operating point of the engine 12 is not changed depending on the total loss $LSS_{TOTAL}$, the efficiency of the vehicle drive device 10 is increased as a whole, i.e., the total loss $LSS_{TOTAL}$ is reduced, and the vehicle fuel efficiency can be improved. The power transmission loss $LSS_{CVT}$ can be calculated based on the power input to the continuously variable transmission 60, i.e., the engine output Pe, and the combined transmission efficiency $\eta_{CVT}$, and the engine loss $LSS_{ENG}$ can be calculated based on a complete combustion engine output $Pe_{CMP}$ that is a lower heating value per unit time when the fuel supplied to the engine 12 is completely combusted, and the engine efficiency $\eta_{ENG}$.

Figure 24:
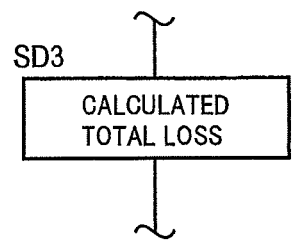
FIG. 24 is a diagram of a step replacing SA3 of FIG. 10 for explaining a flowchart different from that of FIG. 10.
Figure 25:
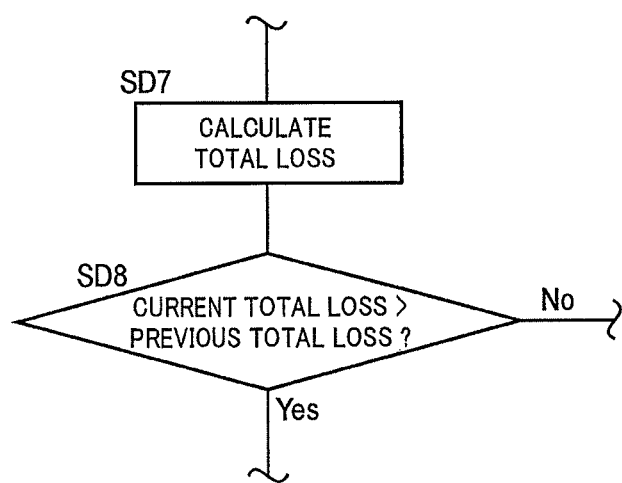
FIG. 25 is a diagram of steps replacing SA7 and SA8 of FIG. 10 in the flowchart described in FIG. 24.

If the operating point of the engine 12 is shifted to the side of a smaller total loss $LSS_{TOTAL}$ as described above, in the flowchart of FIG. 10, SA3 is replaced with SD3 of FIG. 24, and SA7 and SA8 are replaced with SD7 and SD8 of FIG. 25, respectively. SD3, SD7, and SD8 correspond to the engine operating point control means 70.

Specifically describing the flowchart having SD3, SD7, and SD8 in place of SA3, SA7, and SA8 of FIG. 10, SA2 of FIG. 10 is followed by SD3 of FIG. 24, and SD3 is followed by SA4 of FIG. 10. At SD3, as is the case with SA3, the combined transmission efficiency $\eta_{CVT}$ and the engine efficiency $\eta_{ENG}$ are calculated. Fuel consumption in the engine 12 is sequentially detected over time and the complete combustion engine output $Pe_{CMP}$ is calculated based on the fuel consumption per unit time. Relationship between the complete combustion engine output $Pe_{CMP}$ and the fuel consumption per unit time is empirically obtained in advance, for example. The total loss $LSS_{TOTAL}$ is then calculated based on the calculated combined transmission efficiency $\eta_{CVT}$, the engine efficiency $\eta_{ENG}$, and the complete combustion engine output $Pe_{CMP}$.

SA6 of FIG. 10 is followed by SD7 of FIG. 25. At SD7, as is the case with the SD3, the total loss $LSS_{TOTAL}$ based on the current target engine operating point (referred to as a current total loss) is calculated. A previous total loss, i.e., the total loss $LSS_{TOTAL}$ based on the previous target engine operating point, is stored in advance for determination at SD8 of FIG. 25. SD7 is followed by SD8.

At SD8, it is determined whether the previous total loss is smaller than the current total loss. If the determination at SD8 is affirmative, i.e., if the previous total loss is smaller than the current total loss, the operation goes to SA9 of FIG. 10. On the other hand, if the determination at SD8 is negative, the operation goes to SA5 of FIG. 10. Although the replacement of SA3, SA7, and SA8 with SD3, SD7, and SD8, respectively in the flowchart of FIG. 10 makes the difference described above, the other points are the same as the flowchart of FIG. 10.

Although the operation of the lockup clutch L/C is determined from the lockup range map as depicted in FIG. 17 or the lockup range map B as depicted in FIG. 21 in the first and second examples, the total efficiency $\eta_{TOTAL}$ at the time of using the combination transmission path and the lockup time total efficiency $\eta_{LUTOTAL}$ at the time of using the lockup transmission path may sequentially be calculated to select a transmission path advantageous for fuel efficiency improvement.

Although the combination transmission path and the lockup transmission path are compared when the target engine operating point is determined such that the target engine output Pe* is achieved on the engine minimum fuel consumption rate line $L_{FL}$ in the first and second examples, the comparison may be made if the target engine operating point is determined when the system optimum operation mode is selected.

Although the speed ratio e is exemplarily illustrated as a parameter indicative of the power circulation state in the second example, this is not necessarily a limitation. For example, a power circulation rate (=power transmitted via the electric path/engine power) may be defined as a parameter indicative of the power circulation state to drive the lockup clutch L/C to perform the engagement or slip operation if a value of the power circulation rate is greater than a predetermined power circulation rate obtained and stored in advance so as to determine that the power circulation state requires the engagement or slip operation of the lockup clutch L/C.

A plurality of the examples described above may be implemented in a mutually combined manner by setting priorities, for example.

The above description is merely an embodiment and, although not exemplarily illustrated one by one, the present invention may be implemented in variously modified and improved forms based on the knowledge of those skilled in the art without departing from the spirit thereof.

NOMENCLATURE OF ELEMENTS

10: vehicle drive device
12: engine
16: torque converter (hydraulic power transmission device)
16p: pump impeller (input-side rotating element)
16t: turbine impeller (output-side rotating element)
40: electronic control device (control device) 58: drive wheels
L/C: lockup clutch
MG1: first electric motor
MG2: second electric motor

The invention claimed is:

1. A control device of a vehicle drive device including a hydraulic power transmission device having a lockup clutch being configured to directly couple an input-side rotating element to which a power from an engine is input and an output-side rotating element outputting power to drive wheels, a first electric motor directly or indirectly coupled to the input-side rotating element, and a second electric motor directly or indirectly coupled to the drive wheels,
    the control device of a vehicle drive device being configured to have an electric path through which a power is electrically transmitted by giving/receiving electric power between the first electric motor and the second electric motor and a mechanical path through which a power is mechanically transmitted via the hydraulic power transmission device, the control device of a vehicle drive device being configured to control an operating point of the engine by adjusting a torque of the first electric motor,
    to select a transmission path with better power transmission efficiency between
    a power transmission efficiency in a first transmission path transmitting the power of the engine toward the drive wheels by using both the power transmission via the electric path and the power transmission only via fluid in the hydraulic power transmission device in the mechanical path and
    a power transmission efficiency in a second transmission path transmitting the power of the engine toward the drive wheels through power transmission when the lockup clutch of the hydraulic power transmission device is driven to perform an engagement or slip operation in the mechanical path.

2. The control device of a vehicle drive device of claim 1, wherein if the operating point of the engine is differentiated between when the first transmission path is used and when the second transmission path is used, a transmission path is selected that has better total efficiency represented by the product of engine efficiency at each operating point of the engine and the power transmission efficiency.

3. The control device of a vehicle drive device of claim 1, wherein the power transmission efficiency in the first transmission path is obtained based on a transmission efficiency via the electric path and a transmission efficiency only via fluid in the hydraulic power transmission device in the mechanical path.

4. The control device of a vehicle drive device of claim 1, wherein when the power transmission in the first transmission path generates a power circulation state in which the first electric motor consumes an electric power while the second electric motor generates an electric power, the lockup clutch is driven to perform the engagement or slip operation so as to reduce or avoid the power circulation state.

5. The control device of a vehicle drive device of claim 4, wherein when an actual running state is a running state in which the power circulation state is to be avoided predetermined based on deterioration of engine efficiency associated with movement of the operating point of the engine due to the engagement or slip operation of the lockup clutch and improvement in power transmission efficiency due to the engagement or slip operation of the lockup clutch, the lockup clutch is driven to perform the engagement or slip operation.

6. The control device of a vehicle drive device of claim 1, wherein if the operation of the lockup clutch is limited, the lockup clutch is actuated in preference to selecting the transmission path with better power transmission efficiency.

7. The control device of a vehicle drive device of claim 6, wherein if a temperature of operating oil of the lockup clutch is relatively high, priority is given to driving the lockup clutch to perform the engagement operation, and wherein if a temperature of operating oil of the lockup clutch is relatively low, priority is given to driving the lockup clutch to perform release operation or to inhibiting only the slip operation of the lockup clutch.

8. The control device of a vehicle drive device of claim 1, wherein in the first transmission path, the operating point of the engine is shifted to a side of greater total efficiency represented by the product of engine efficiency at the operating point of the engine and power transmission efficiency of the first transmission path.

9. The control device of a vehicle drive device of claim 1, wherein the torque of the first electric motor is adjusted so that a sum of an engine torque and the torque of the first electric motor is balanced with an input-side load torque generated in the input-side rotating element depending on a speed ratio of the hydraulic power transmission device, the input-side load torque is obtained based on an engine rotation speed indicated by a target engine operating point and the torque of the first electric motor is determined based on the input-side load torque and the engine torque indicated by the target engine operating point.

10. The control device of a vehicle drive device of claim 1, wherein the power transmission efficiency in the second transmission path is obtained based on a loss of the lockup clutch.

* * * * *